(12) United States Patent
Okada et al.

(10) Patent No.: US 7,404,848 B2
(45) Date of Patent: Jul. 29, 2008

(54) HUMIDIFIER AND A METHOD FOR PRODUCING THE SAME

(75) Inventors: Tatsunori Okada, Tokyo (JP); Hajimu Yoshiyasu, Tokyo (JP); Tatsuya Hayashi, Tokyo (JP); Hideo Ichimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 469 days.

(21) Appl. No.: 11/133,218

(22) Filed: May 20, 2005

(65) Prior Publication Data

US 2006/0112827 A1 Jun. 1, 2006

(30) Foreign Application Priority Data

Nov. 29, 2004 (JP) ............................. 2004-344113

(51) Int. Cl.
*B01D 53/22* (2006.01)
*B01D 63/08* (2006.01)

(52) U.S. Cl. ............................. 96/7; 96/4; 96/9; 96/11; 95/45; 95/52; 429/19; 156/60; 156/326; 261/104; 261/107

(58) Field of Classification Search ............... 96/4, 96/7, 9, 11; 95/45, 52; 210/650, 640; 429/36, 429/19; 156/60, 326; 261/104, 107
See application file for complete search history.

(56) References Cited

U.S. PATENT DOCUMENTS

| | | | | |
|---|---|---|---|---|
| 3,735,559 A | * | 5/1973 | Salemme | 95/52 |
| 5,348,691 A | * | 9/1994 | McElroy et al. | 261/104 |
| 5,595,690 A | * | 1/1997 | Filburn et al. | 261/104 |
| 6,126,723 A | * | 10/2000 | Drost et al. | 96/9 |
| 6,171,374 B1 | * | 1/2001 | Barton et al. | 96/7 |
| 6,869,462 B2 | * | 3/2005 | TeGrotenhuis et al. | 96/7 |
| 2003/0012999 A1 | | 1/2003 | Yoshioka et al. | |
| 2003/0134173 A1 | | 7/2003 | Hatoh et al. | |
| 2003/0150162 A1 | * | 8/2003 | Inagaki et al. | 48/195 |
| 2004/0226886 A1 | * | 11/2004 | Hester et al. | 210/650 |

FOREIGN PATENT DOCUMENTS

| | | |
|---|---|---|
| DE | 37 27 282 A1 | 2/1988 |
| DE | 103 03 655 A1 | 8/2003 |
| DE | 102 45 202 A1 | 4/2004 |
| GB | 2 193 838 A * | 2/1988 |
| JP | 8-45517 | 2/1996 |

* cited by examiner

*Primary Examiner*—Jason M Greene
(74) *Attorney, Agent, or Firm*—Oblon, Spivak, McClelland, Maier & Neustadt, P.C.

(57) ABSTRACT

A humidifier and a method for producing it can reduce gas leakage through inside the surfaces of humidifying membranes or through interfaces between the humidifying membranes and separators. The humidifier includes water permeable humidifying membranes and gas separators each having one or two channels opened at least one side in a direction of lamination, through which at least one of a dry gas and a wet gas is caused to flow. A humidifying membrane, a gas separator, a humidifying membrane and a gas separator are repeatedly laminated one over another in this order, or a gas separator, a humidifying membrane and a gas separator are repeatedly laminated one over another in this order. Each gas separator has a frame-shaped portion surrounding the one or two channels, and that portion of each humidifying membrane which, when laminated, faces the frame-shaped portion of a corresponding gas separator is filled with a resin.

15 Claims, 17 Drawing Sheets

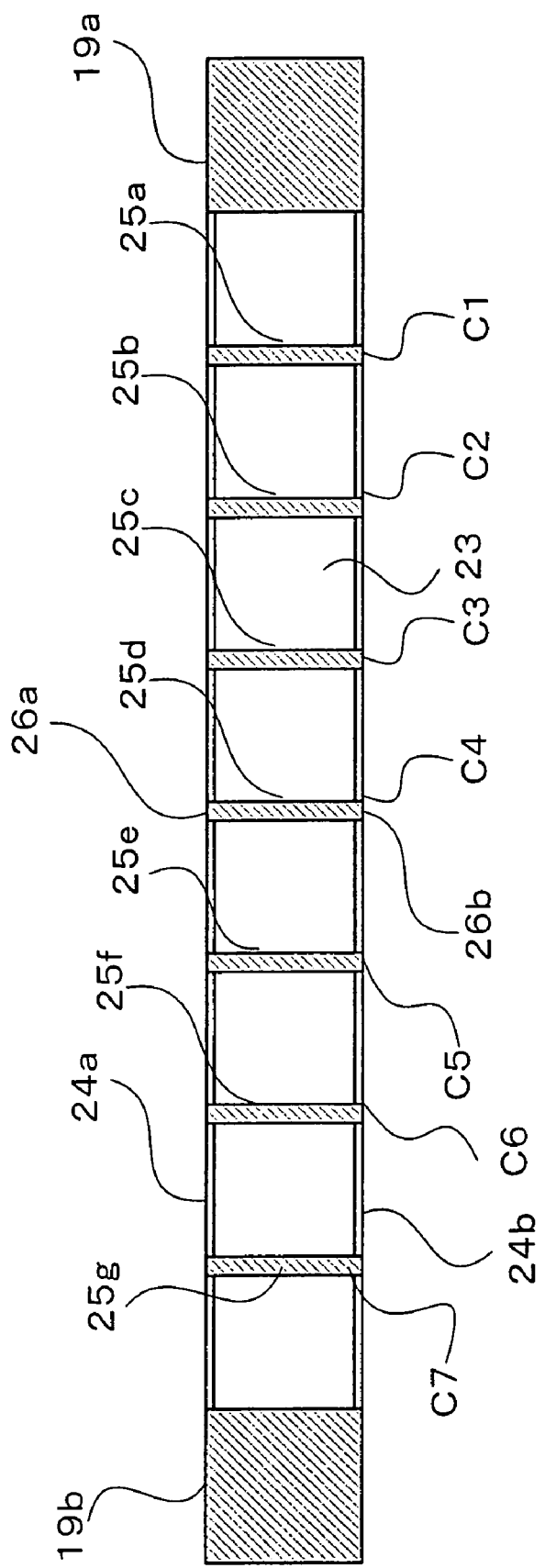

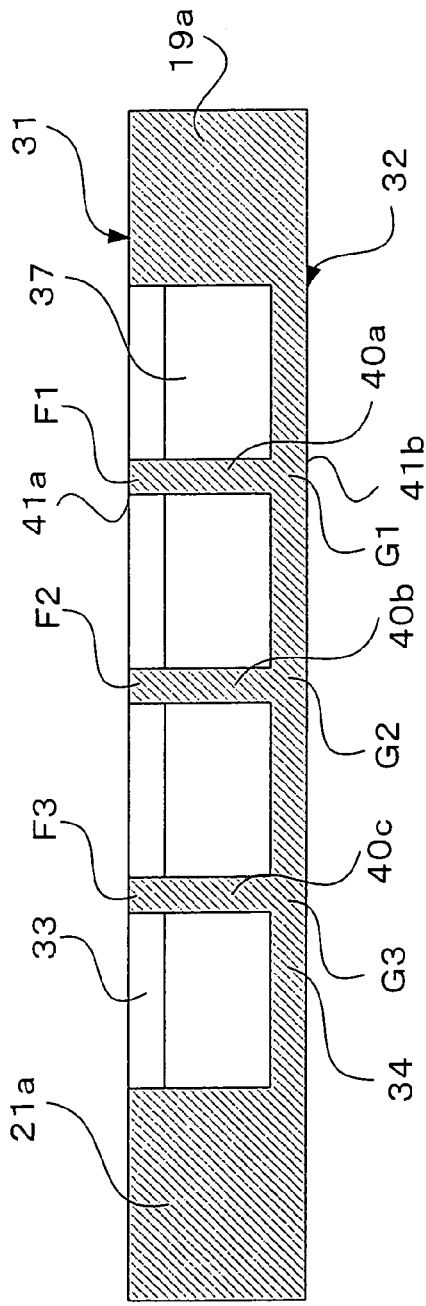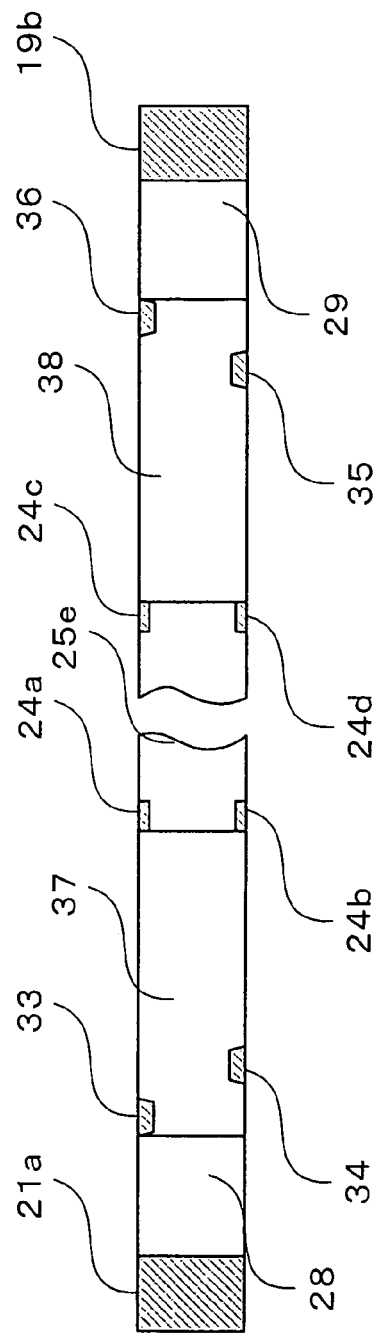

HUMIDIFIER AND A METHOD FOR PRODUCING THE SAME

BACKGROUND OF THE INVENTION

1. Field of the Invention

The present invention relates to a humidifier and its production method capable of humidifying a dry gas with the moisture that is transmitted from a wet gas through a moisture permeable humidifying membrane, and more particularly, it relates to a humidifier for a fuel cell and its production method that serve to humidify an unreacted gas with the moisture transmitted from an exhaust gas from the fuel cell through a humidifying membrane.

2. Description of the Related Art

A known humidifier is constructed such that a humidifying membrane is clamped by a first separator, which has channel grooves formed to guide a dry gas to flow therealong and is arranged so as to face one side surface of a humidifying membrane, and a second separator which has channel grooves formed to guide a wet gas to flow therealong and is arranged so as to face the other side surface of the humidifying membrane. In order to prevent the blowby of the gases from the outer peripheral portion of the humidifying membrane, the mutually facing peripheral portions of both of the separators are fittingly engaged with each other to compress the humidifying membrane, so that pores in the outer peripheral portion of the humidifying membrane facing the outer peripheral portions of the separators are reduced, thereby shielding the flows of the gases that permeate through the humidifying membrane in its surface directions.

In addition, there is employed a method of bonding between the outer peripheral portions of the separators and the portions of the humidifying membrane facing the outer peripheral portions of the separators by means of a silicone based adhesive material. As general methods of coating such a adhesive material on the outer peripheral portions of the separators suitable for mass production, there are known a method of spray coating, a method of transferring an adhesive material, and so on (see, for example, a first patent document: Japanese patent application laid-open No. 2003-314983).

However, there is a problem that even the reduction of pores in the humidifying membrane by compression thereof can not completely block gas channels in the humidifying membrane, thus permitting leakage of gases therethrough.

In addition, with the method of coating the adhesive material on the outer peripheral portions of the separators, the viscosity of the adhesive is large, and the size of each pore in the humidifying membrane is small, so there arises a problem that in general, the adhesive can not be filled or impregnated into the pores in the humidifying membrane completely or to any satisfactory extent, thus permitting the gases to permeate through inside the humidifying membrane in its surface direction.

In this case, even if a solvent is mixed with the adhesive, so that the viscosity of the adhesive can be lowered to permit the adhesive to be filled up into small pores to a satisfactory extent, there will be another problem that empty pores still remain due to evaporation of the solvent occurring after the filling or impregnation of the pores.

Moreover, if there exist gaps inside the humidifying membrane and in the interfaces between the humidifying membrane and the separators, there will arise a further problem that water or moisture in the humidifying membrane escapes or leaks into the outside due to the capillary action, so moisture in the humidifying membrane is reduced, thus making it impossible to humidify or moisten the dry gas to a sufficient extent.

SUMMARY OF THE INVENTION

Accordingly, the object of the present invention is to provide a humidifier and a method of manufacturing the same which can reduce the amount of blowby gases that permeate through a humidifying membrane and/or interfaces between the humidifying membranes and separators.

A humidifier according to the present invention includes: a plurality of moisture permeable humidifying membranes; and a plurality of gas separators each having one or two channels opened on at least one side in a direction of lamination, through which at least one of a dry gas and a wet gas is caused to flow; wherein one of the humidifying membranes, one of the gas separators, another one of the humidifying membranes, and another one of the gas separators are repeatedly laminated one over another in this order, or one of the gas separators, one of the humidifying membranes, and another one of the gas separators are repeatedly laminated one over another in this order. Each of the gas separators has a frame-shaped portion surrounding the one or two channels; and those portions of the humidifying membranes which, when laminated, are arranged to face the frame-shaped portions of the gas separators are filled with a resin.

According to the humidifier of the present invention as described above, there are achieved the following advantageous effects. Since the resin is filled into the outer peripheral portions of the humidifying membranes, it is possible to prevent the dry gas and the wet gas from permeating through the humidifying membranes in a direction parallel to their surfaces to leak into the outside.

Further, since the frame-shaped portions of the humidifying membranes, the dry gas separators and the wet gas separators are bonded to one another by the resin, it is possible to prevent the leakage of the gases through interfaces between the humidifying membranes and the dry gas separators and between the humidifying membranes and the wet gas separators.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 6 is a cross sectional view of the dry gas separator in the M-M section of FIG. 5.

FIG. 7A is a cross sectional view of the dry gas separator in the P-P section of FIG. 5.

FIG. 7B is a cross sectional view of the dry gas separator in the N-N section of FIG. 5.

DESCRIPTION OF THE PREFERRED EMBODIMENTS

Hereinafter, preferred embodiments of the present invention will be described in detail while referring to the accompanying drawings.

Embodiment 1

Figure 1:
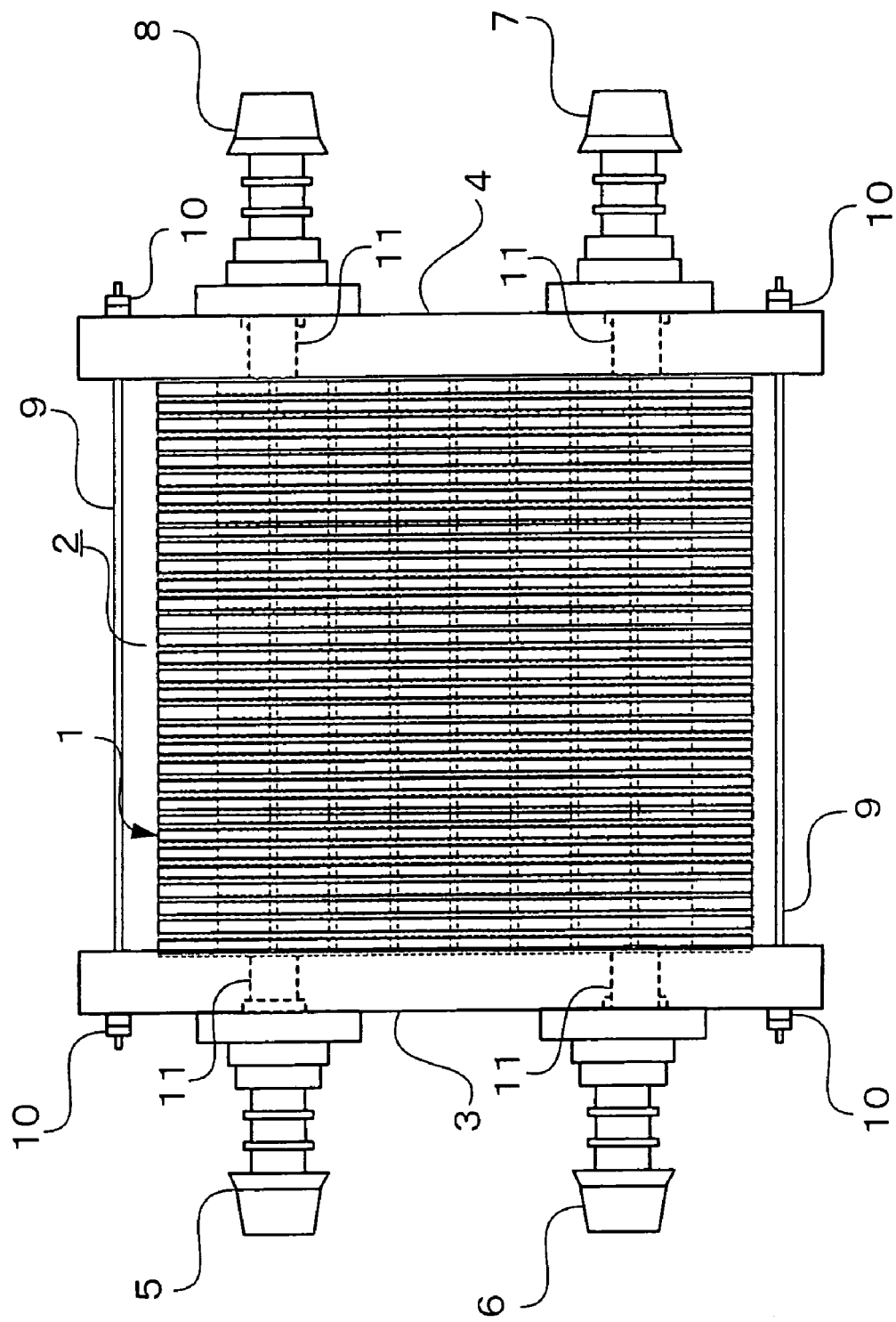
FIG. 1 is a side elevation of a humidifier according to a first embodiment of the present invention.
Figure 2:
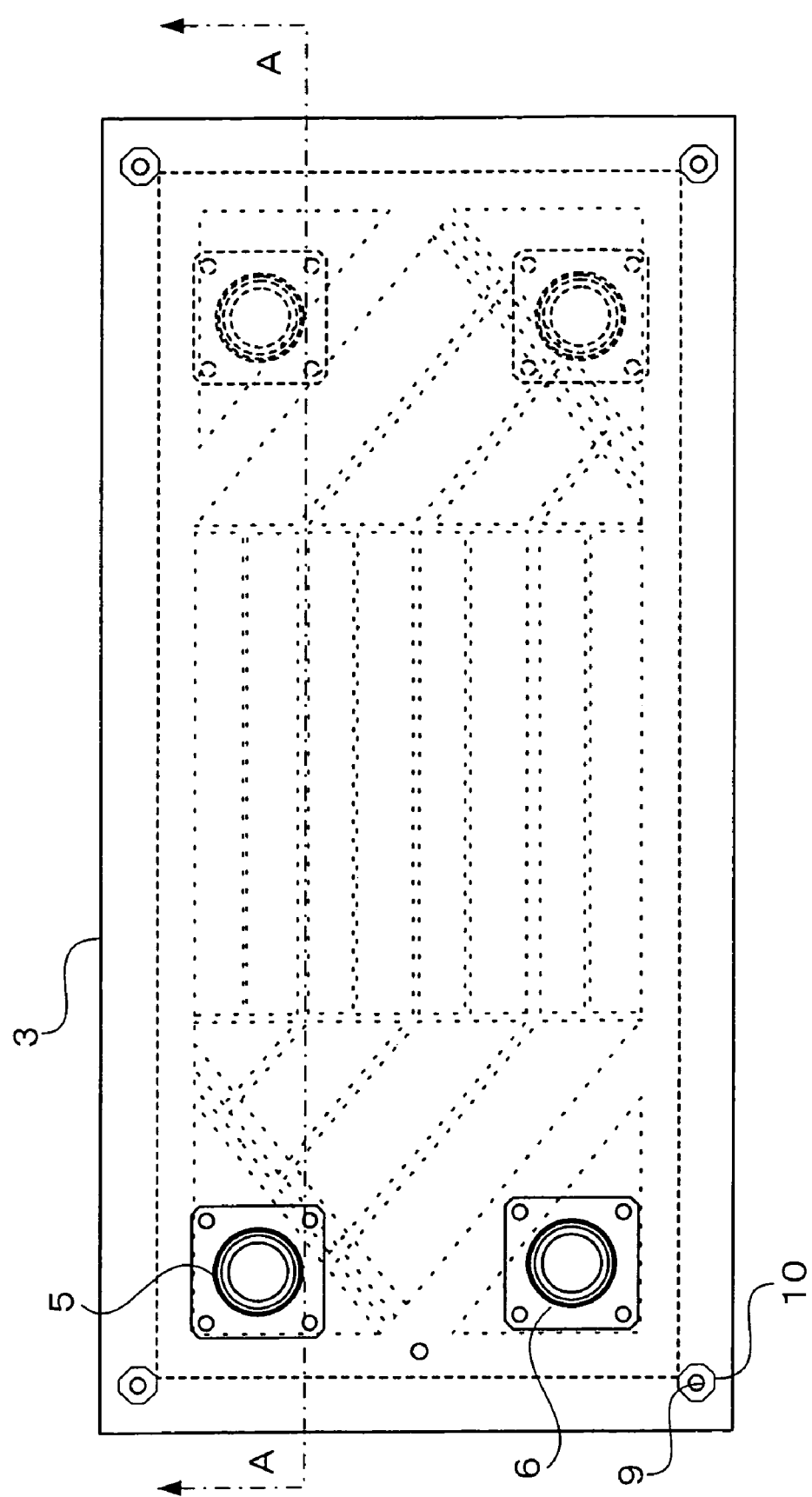
FIG. 2 is a top plan view of the humidifier of the first embodiment of the present invention.
Figure 3:
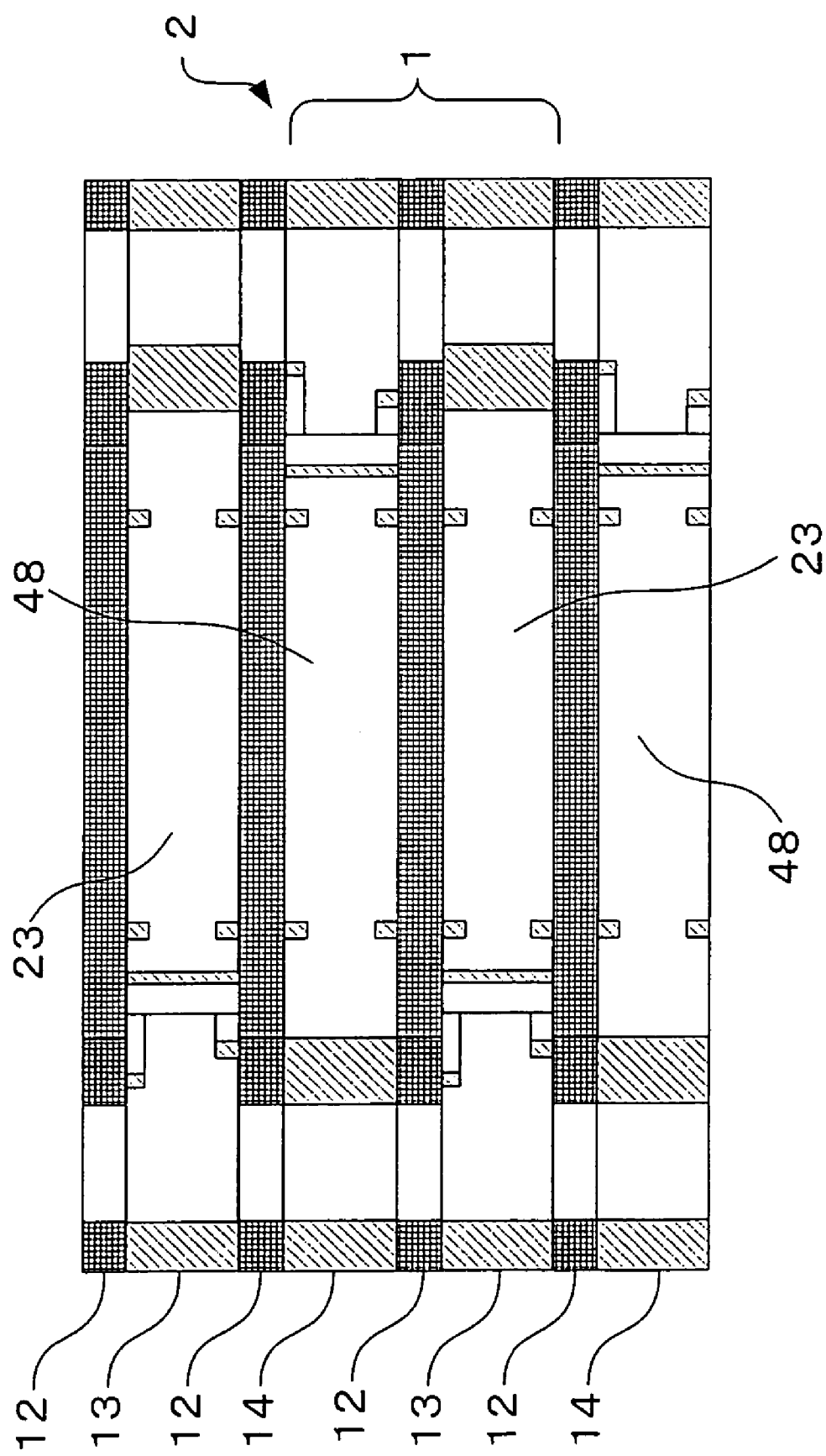
FIG. 3 is a partial cross sectional view of a humidifying cell in the A-A section of FIG. 2.
Figure 4:
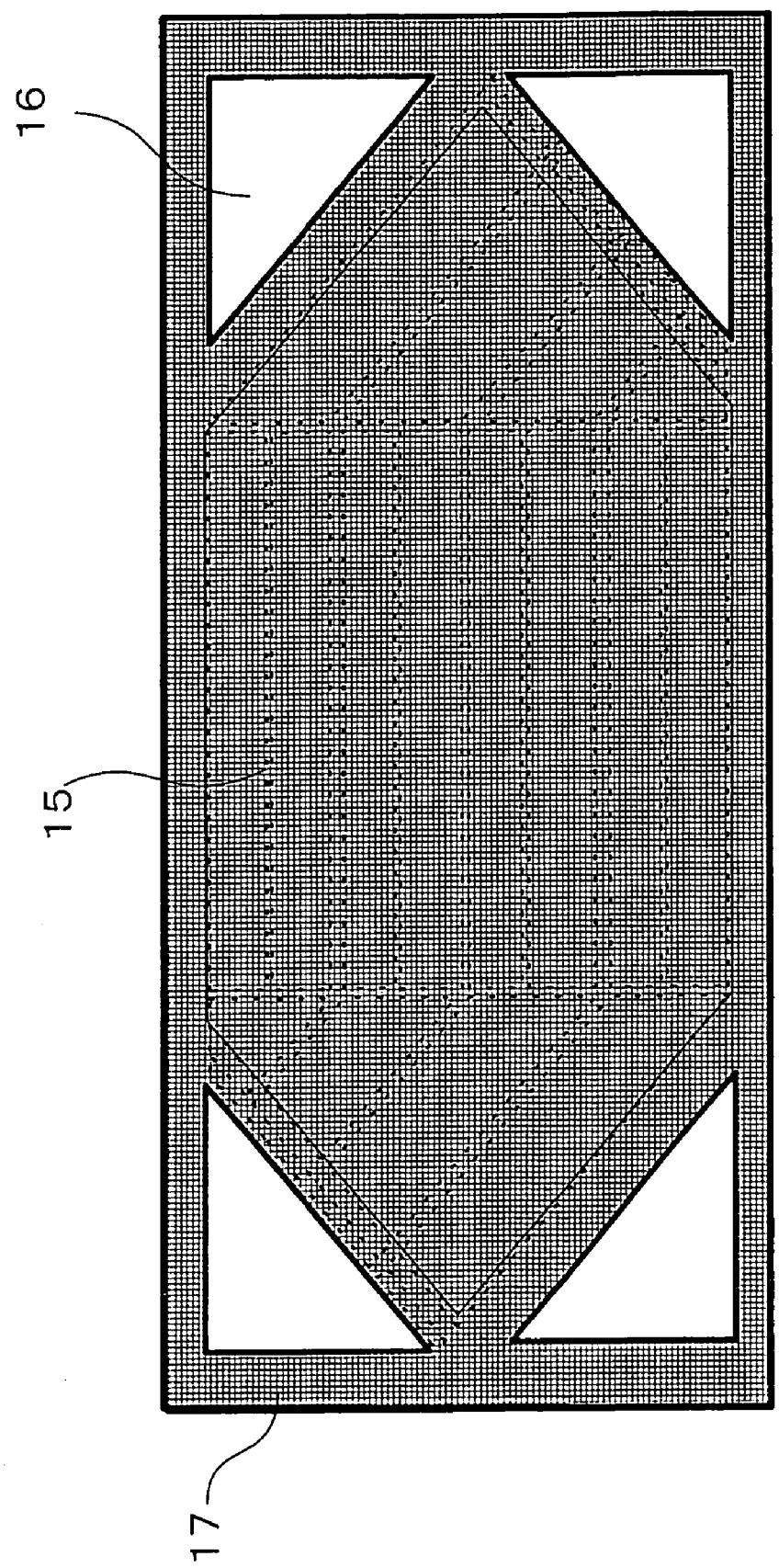
FIG. 4 is a plan view of the humidifying cell according to the first embodiment of the present invention.
Figure 5:
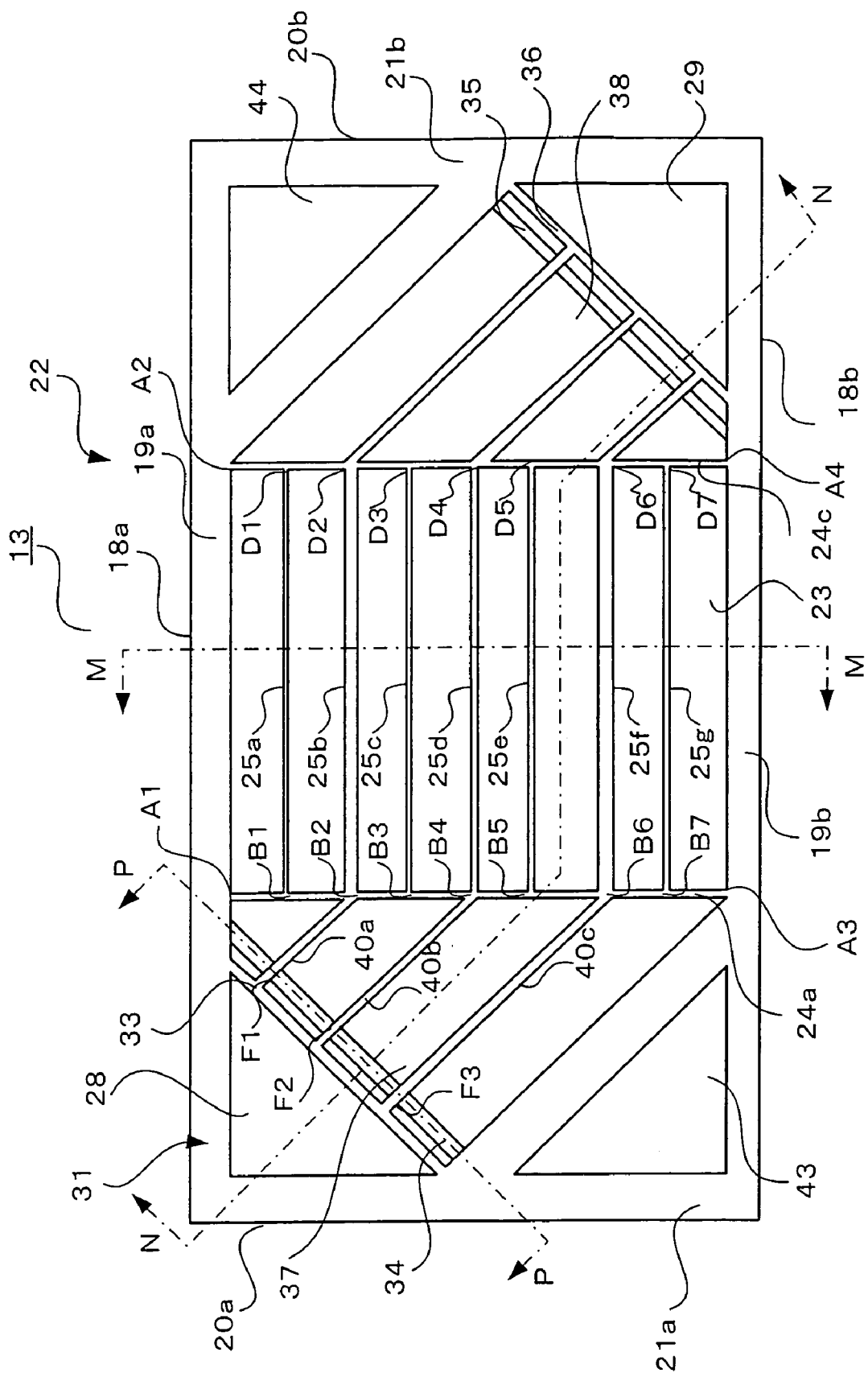
FIG. 5 is a plan view of a dry gas separator according to the first embodiment of the present invention.
Figure 8:
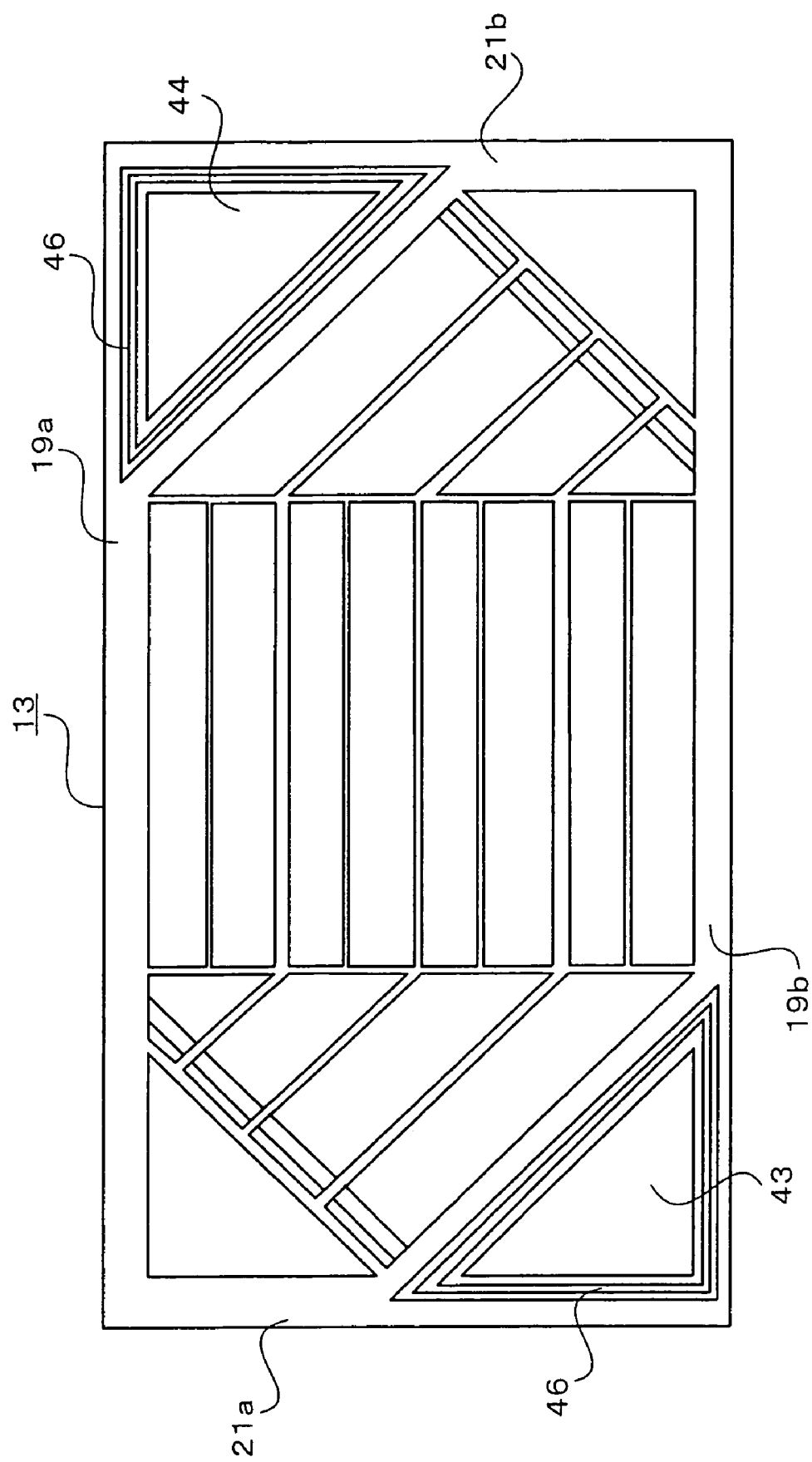
FIG. 8 is a plan view of a modified dry gas separator according to the first embodiment of the present invention.
Figure 9:
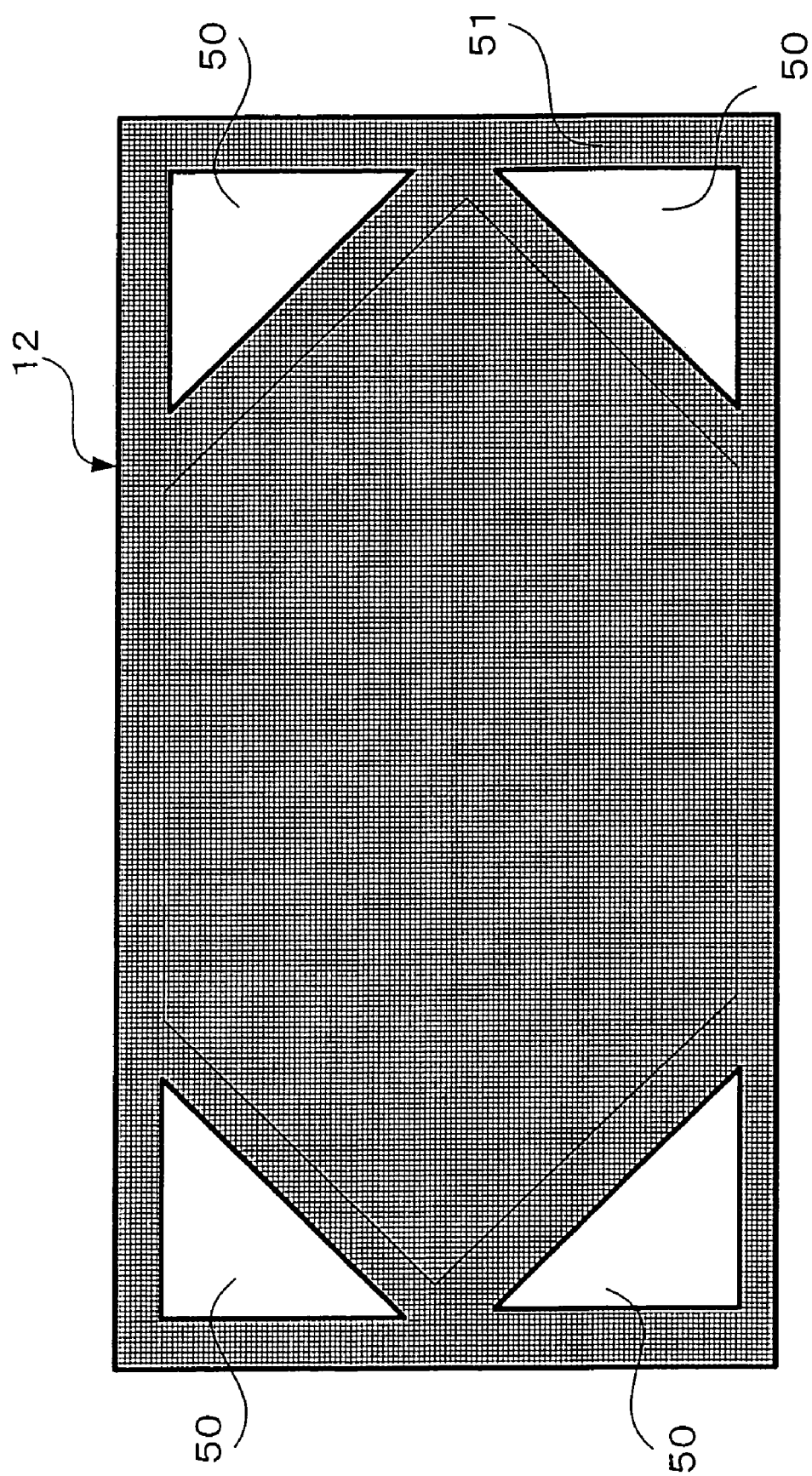
FIG. 9 is a plan view of a humidifying membrane according to the first embodiment of the present invention.

Now, reference will be first made to a humidifier constructed according to a first embodiment of the present invention with reference to FIGS. 1 through 9, in which FIG. 1 is a side elevation of the humidifier; FIG. 2 is a top plan view of the humidifier; FIG. 3 is a partial cross sectional view of a humidifying cell in the A-A section of FIG. 2; FIG. 4 is a plan view of the humidifying cell; FIG. 5 is a plan view of a dry gas separator according to the first embodiment; FIG. 6 is a cross sectional view of the dry gas separator in the M-M section of FIG. 5; FIG. 7A is a cross sectional view of the dry gas separator in the P-P section of FIG. 5; FIG. 7B is a cross sectional view of the dry gas separator in the N-N section of FIG. 5; FIG. 9 is a plan view of a humidifying membrane according to the first embodiment. Here, note that FIG. 4 illustrates the humidifying cell with the humidifying membrane placed on top, as seen downwardly from above, and the appearances of a dry gas channel and a wet gas channel are represented by broken lines in a part corresponding to a moisture transmission portion.

Here, note that in the following description, a dry gas will be explained as a gas that is near ordinary or room temperature and has a relative humidity of a near-zero value. Also, a wet gas will be explained as a gas of the same kind as the dry gas, which is, for example, at a temperature of 70° C. or above and at a relative humidity of 90% or more. For example, such a gas is an oxidant or cathode gas in the form of an air gas in a proton-exchange membrane fuel cell or solid polymer fuel cell.

As shown in FIG. 1 and FIG. 2, the humidifier of this first embodiment includes a humidifying laminated body 2 formed of a plurality of humidifying cells 1 which are laminated one over another, an inlet holding plate 3 and an outlet holding plate 4 which cooperate to clamp the humidifying laminated body 2 in a direction of lamination thereof, a dry gas input pipe 5 and a wet gas output pipe 6 which are both attached to the inlet holding plate 3, a dry gas output pipe 7 and a wet gas input pipe 8 which are both attached to the outlet holding plate 4, and bolts 9 and nuts 10 which serve to tighten the humidifying laminated body 2 and the inlet and outlet holding plates 3, 4 together while clamping the humidifying laminated body 2 by the inlet and outlet holding plates 3, 4.

The input holding plate 3 and the outlet holding plate 4 each have their outer shape in a plan view larger in size than that of the humidifying laminated body 2, and they support the humidifying laminated body 2 by tightening it between the input holding plate 3 and the outlet holding plate 4 by means of the bolts 9 and nuts 10 at locations outside the humidifying laminated body 2. The humidifying laminated body 2 has a rectangular outer shape in a cross section normal to the direction of lamination, with the length of a long side being 32 cm, and the length of a short side being 15 cm.

Each of the inlet holding plate 3 and the outlet holding plate 4 has an outside shape similar to that of the humidifying laminated body 2 in the cross section normal to the direction of lamination thereof, and has two holes 11 extending therethrough in a thickness direction thereof along the short sides thereof. The dry gas input pipe 5 and the wet gas output pipe 6 are connected with the two holes 11 in the inlet holding plate 3, respectively, to form corresponding gas passages or channels. Also, the dry gas output pipe 7 and the wet gas input pipe 8 are connected with the two holes 11 in the outlet holding plate 4, respectively, to form corresponding gas passages. The inlet holding plate 3 and the outlet holding plate 4 are made of stainless steel, and each have two long sides of 32 cm, two short sides of 15 cm, and a thickness of 1 cm.

Next, the humidifying cells 1 will be described while referring to FIG. 3. Each humidifying cell 1 includes a humidifying membrane 12 through which moisture can permeate, and a dry gas separator 13 and a wet gas separator 14 which serve to clamp the humidifying membrane 12 therebetween from its opposite sides. A humidifying membrane 12, a dry gas separator 13, a humidifying membrane 12, and a wet gas separator 14 are repeatedly laminated or stacked one over another in this order to construct the humidifying laminated body 2. The inlet holding plate 3 and the outlet holding plate 4 are laminated onto the dry gas separator 13 and the wet gas separator 14, respectively, at the opposite ends in the lamination direction of the humidifying laminated body 2. A dry gas channel 23 is formed by two adjacent humidifying membranes 12 and a dry gas separator 13 clamped therebetween, and a wet gas channel 48 is formed by two adjacent humidifying membranes 12 and a wet gas separator 14 clamped therebetween.

Each humidifying cell 1 can be described by dividing its surface into three portions, as shown in FIG. 4. The first portion is moisture transmission portions 15 that serve to transmit moisture from the wet gas to the dry gas through the humidifying membranes 12. The second portion is manifold portions 16 that serve to transport the wet gas and the dry gas in the thickness direction. The third portion is seal portions 17 that serve to seal the wet gas and the dry gas so as to prevent them from mixing with each other.

Next, the dry gas separator 13 will be described while referring to FIG. 5, FIG. 6 and FIG. 7. FIG. 6 is a cross sectional view of dry gas channels 23 of the dry gas separator 13 in the M-M section of FIG. 5 normal to the direction of flow of the dry gas. FIG. 7A is a cross sectional view of an upper surface seal portion 31 and a lower surface seal portion 32 in the P-P section of FIG. 5 in the direction of flow of the dry gas. FIG. 7B is a cross sectional view in the N-N section of FIG. 5 in parallel to the direction of flow along the dry gas channel. Here, note that the wet gas separator 14 is in line symmetry with respect to the dry gas separator 13 with the center line of the short sides thereof being placed as the center line of symmetry, so the components of the wet gas separator 14 are identified by the same reference numerals as those of the dry gas separator 13 while omitting an explanation thereof.

As shown in FIG. 5, the dry gas separator 13 has a rectangular outer shape, and is provided with a frame-shaped portion 22 comprising a pair of side frame-shaped portions 19a, 19b arranged along long sides 18a, 18b, respectively, and a pair of end frame-shaped portions 21a, 21b arranged along short sides 20a, 20b, respectively. The frame-shaped portion 22 has a thickness of 2.75 mm.

In addition, the dry gas channels 23 in parallel to the long sides 18a, 18b are arranged at the longitudinal center of the frame-shaped portion 22 in the central portion of the dry gas separator 13 enclosed or surrounded by the frame-shaped portion 22. Further, a support point A1 and a support point A2, being spaced apart from each other a distance corresponding to the length of each dry gas channel 23, are decided or set at an inner side of the side frame-shaped portion 19a, and similarly, a support point A3 and a support point A4, being spaced apart from each other a distance corresponding to the length of each dry gas channel 23, are decided or set at an inner side of the side frame-shaped portion 19b. A pair of partition support bars 24a, 24b (FIG. 7B) are bridged between the support point A1 and the support point A3 in two stages in the direction of lamination, and similarly, a pair of partition support bars 24c, 24d (FIG. 7B) are bridged between the support point A2 and the support point A4 in two stages in the direction of lamination. The partition support bars 24a, 24c arranged at an upper side in the lamination direction have their upper surfaces arranged flush with the upper surfaces of the side frame-shaped portions 19a, 19b and the end frame-shaped portions 21a, 21b, and the partition support bars 24b, 24d arranged at a lower side in the lamination direction have their lower surfaces arranged flush with the lower surfaces of the side frame-shaped portions 19a, 19b and the end frame-shaped portions 21a, 21b. The partition support bars 24a, 24b, 24c, 24d each have a thickness of 1 mm in the direction of lamination, and a width of 1.5 mm in the longitudinal direction thereof.

Moreover, a support point B1 through a support point B7 and a support point C1 through a support point C7 (FIG. 6) are decided or set on the partition support bars 24a, 24b at positions at which the distance between the support point A1 and the support point A3 is equally divided into eight parts, and a support point D1 through a support point D7 and a support point E1 through a support point E7 (not shown) are decided or set on the partition support bars 24c, 24d at positions at which the distance between the support point A2 and the support point A4 is equally divided into eight parts. The dry gas channels 23 are divided by a plurality of partitions 25a through 25 g, each of which is of a hexahedron having a long side of 20 cm corresponding to the length of each dry gas channel 23, a short side of 2.75 mm corresponding to the height of each dry gas channel 23, and a thickness of 1 mm. Each long side of the partition 25a has four corners supported at the support point B1, the support point C1, the support point D1 and the support point E1, and the partition 25a divides the dry gas channels 23 in a short side direction of the dry gas separator 13. Similarly, additional partitions including from the partition 25b, which has its four corners supported at the support point B2, the support point C2, the support point D2, and the support point E2, to the partition 25 g, which has its four corners supported at the support point B7, the support point C7, the support point D7, and the support point E7, are arranged in parallel to the partition 25a. Here, note that when the seven partitions 25a, 25b, 25c, 25d, 25e, 25f, 25g are shown collectively, they are represented as partitions 25. The partitions 25 have their upper long end faces 26a (FIG. 6) at an upper side in the lamination direction arranged flush with the upper surfaces of the side frame-shaped portions 19a, 19b and the end frame-shaped portions 21a, 21b, and their lower long end faces 26b (FIG. 6) at a lower side in the lamination direction arranged flush with the lower surfaces of the side frame-shaped portions 19a, 19b and the end frame-shaped portions 21a, 21b. The dry gas channels 23 are formed by enclosure of the partitions 25 and the humidifying membranes 12 laminated vertically in the lamination direction.

The dry gas separator 13 has a first dry gas supply manifold 28 provided at its one longitudinal end so as to extend therethrough in the direction of lamination, and a first dry gas exhaust manifold 29 arranged at a location that is in point symmetry of 180 degrees with respect to the first dry gas supply manifold 28 with the central point of the dry gas separator 13 being placed at the center of symmetry so as to extend therethrough in the direction of lamination.

Further, as shown in FIG. 5 and FIG. 7A, the dry gas separator 13 has an upper surface seal portion 31 and a lower surface seal portion 32 (FIG. 7A) arranged in upper and lower stages in the direction of lamination so as to surround the first dry gas supply manifold 28. The upper surface seal portion 31 comprises a side frame-shaped portion 19a and an end frame-shaped portion 21a arranged to enclose the surroundings of the first dry gas supply manifold 28 near the upper surface in the lamination direction of the dry gas separator 13, and an upper surface seal forming plate 33 bridged between the side frame-shaped portion 19a and the end frame-shaped portion 21a. The upper surface seal forming plate 33 has an upper surface in the lamination direction arranged flush with upper surfaces in the lamination direction of the side frame-shaped portion 19a and the end frame-shaped portion 21a, and the thickness in the lamination direction of the upper surface seal forming plate 33 is 1 mm. Also, the lower surface seal portion 32 comprises a side frame-shaped portion 19a and an end frame-shaped portion 21a arranged to enclose the surroundings of the first dry gas supply manifold 28 near the lower surface in the lamination direction of the dry gas separator 13, and a lower surface seal forming plate 34 bridged between the side frame-shaped portion 19a and the end frame-shaped portion 21a. The lower surface seal forming plate 34 has a lower surface in the lamination direction arranged flush with lower surfaces in the lamination direction of the side frame-shaped portion 19a and the end frame-shaped portion 21a, and the thickness in the lamination direction of the lower surface seal forming plate 34 is 1 mm. The upper surface seal forming plate 33 and the lower surface seal forming plate 34 are arranged at positions at which they do not overlap with each other when projected in the direction of lamination.

As shown in FIG. 5 and FIG. 7B, the dry gas separator 13 includes first aggregate communication grooves 37 which serve to place one ends of the dry gas channels 23 in fluid communication with the first dry gas supply manifold 28 so that the dry gas flowing therein is supplied from the first dry gas supply manifold 28 to the dry gas channels 23, and second aggregate communication grooves 38 which serve to place the other ends of the dry gas channels 23 in fluid communication with the first dry gas exhaust manifold 29 so that the dry gas flowing therein is exhausted from the dry gas channels 23 to the first dry gas exhaust manifold 29. A support point F1 through a support point F3 and a support point G1 through a support point G3 for equally dividing a length extending between the side frame-shaped portion 19a and the end frame-shaped portion 21a astride the aggregate communication groove 37 into four parts are decided or set for the upper surface seal forming plate 33 and the lower surface seal forming plate 34, respectively. The aggregate communication groove 37 is divided by three support walls 40a, 40b, 40c, each of which is of a hexahedron and has four corners supported at four support points, i.e., a support point B2, a support point C2, a support point F1 and a support point G1. In this regard, note that when the three support walls 40a, 40b, 40c are referred to collectively, they are generally called a support wall 40. Each support wall 40 has an upper end face 41a in the lamination direction (FIG. 7A) arranged flush with the upper surface in the lamination direction of the side frame-shaped portion 19a. Also, each support wall 40 has a lower end face 41b in the lamination direction (FIG. 7B) arranged flush with the lower surface in the lamination direction of the side frame-shaped portion 19a.

Although the seven partitions 25 are arranged in the dry gas channel 23, the width of each of the aggregate communication grooves 37, 38 is narrower than that of the dry gas channel 23, so the three support walls 40 are arranged in each of the aggregate communication grooves 37, 38. In addition, since the support walls 40 are coupled with the partitions 25, the humidifying membranes 12 are supported steplessly from the first dry gas supply manifold 28 to the first dry gas exhaust manifold 29.

Similarly, a second upper surface seal forming plate 36 and a second lower surface seal forming plate 35 are arranged around the first dry gas exhaust manifold 29.

Since the three support walls 40 are arranged in each of the aggregate communication grooves 37, 38 in this manner, the upper surface seal forming plates 33, 36 and the lower surface seal forming plates 34, 35, each of which has a thickness of 1 mm and is weaker in mechanical strength than the side frame-shaped portions 19a, 19b and the end frame-shaped portions 21a, 21b of 2.75 mm in thickness, are reinforced in their mechanical strength.

The dry gas separator 13 includes a second wet gas exhaust manifold 43 and a second wet gas supply manifold 44 extending through the end frame-shaped portions 21a, 21b, respectively, the second wet gas exhaust manifold 43 being arranged adjacent to the first dry gas supply manifold 28 along the short side 20a, the second wet gas supply manifold 44 being arranged adjacent to the first dry gas exhaust manifold 29 along the short side 20b.

The first dry gas supply manifold 28, the first dry gas exhaust manifold 29, the second wet gas exhaust manifold 43 and the second wet gas supply manifold 44 are arranged at positions of point symmetry of 180 degrees, respectively, with the central point of the dry gas separator 13 being placed as the center of symmetry.

Here, note that those portions of the humidifying membranes 12 which face the dry gas channel 23 and the aggregate communication grooves 37, 38 effectively contribute to a temperature exchange and a humidity exchange.

On the other hand, the wet gas separator 14 is arranged such that when wet gas channels 48 (FIG. 3), the first wet gas supply manifold, the first wet gas exhaust manifold, the second dry gas supply manifold, and the second dry gas exhaust manifold are superposed on the dry gas separator 13 through the humidifying membranes 12, the wet gas separator 14 is superposed on the dry gas channels 23, the second wet gas supply manifold 44, the second wet gas exhaust manifold 43, the first dry gas supply manifold 28, and the first dry gas exhaust manifold 29. Thus, the wet gas separator 14 becomes similar to the one that is the dry gas separator 13 turned inside out in a short-side direction.

With respect to the dry gas separator 13, those which correspond to the moisture transmission portions 15 are the dry gas channels 23 and the aggregate communication grooves 37, 38, and those which correspond to the manifold portions 16 are the dry gas supply manifold 28, the dry gas exhaust manifold 29, the wet gas supply manifold 44 and the wet gas exhaust manifold 43, and those which correspond to the seal portions 17 are the side frame-shaped portions 19a, 19b, the end frame-shaped portions 21a, 21b, the upper surface seal portion 31 and the lower surface seal portion 32.

For example, the dry gas separator 13 and the wet gas separator 14 are made of polyphenylene sulfide (PPS) resin and molded by means of a resin molding method. Specifically, a split metallic mold, which can be commonly used for the dry gas separator 13 and the wet gas separator 14 and divided in the direction of lamination is prepared, and a liquid PPS resin is poured or injected into the mold, and the molded product is taken out from the mold by dividing it after solidification of the resin. The dry gas separator 13 and the wet gas separator 14 each take the shape of a hexahedron with a long side of 32 cm, a short side of 15 cm and a thickness of 2.75 mm.

Here, note that the sealing performance of boundary layers with the humidifying membranes 12 can be improved by forming V grooves 46 in the side frame-shaped portions 19a, 19b and the end frame-shaped portions 21a, 21b surrounding the wet gas supply manifold 44 and the wet gas exhaust manifold 43 of the dry gas separator 13, as shown in FIG. 8.

Next, the humidifying membranes 12 will be described while referring to FIG. 9.

The humidifying membranes 12 are membranes which are interposed between the wet gas and the dry gas to permit moisture to permeate therethrough, and which are mainly made of porous polytetrafluoroethylene (PTFE), and each has a thickness of about 100 μm.

In addition, the humidifying membranes 12 are provided with through holes 50 which are arranged at positions to superpose on the first dry gas supply manifold 28, the first dry gas exhaust manifold 29, the second wet gas exhaust manifold 43, and the second wet gas supply manifold 44 when the humidifying membranes 12 are superposed on the dry gas separator 13. The through holes 50 are those portions of the humidifying membranes 12 which correspond to the manifold portions 16.

Also, the humidifying membranes 12 are provided with resin-filled portions 51 into which the resin is filled at positions at which the humidifying membranes 12, when superposed on the dry gas separator 13, are superposed on the side frame-shaped portions 19a, 19b, the end frame-shaped portions 21a, 21b, the upper surface seal portion 31 and the lower surface seal portion 32. The resin filled portions 51 are those portions of the humidifying membranes 12 which correspond to the seal portions 17, and a central portion of each humidifying membrane 12 surrounded by a corresponding resin filled portion 51 corresponds to the moisture transmission portion 15 of each humidifying membrane 12.

Next, materials for the resin to be filled into the humidifying membranes 12 will be described. The resin materials that can be used for this usage should be materials that have stability under the environment in the humidifier, and in particular are durable against the wet gas in the humidifier for an extended period of time. In addition, the resin materials need be filled or impregnated into the humidifying membranes 12, and hence they should have sufficient flowability during resin filling work.

If a resin filled can bond the humidifying membranes 12 to the dry gas separator 13 and the wet gas separator 14, the humidifying membranes 12 can be supported more uniformly by the dry gas separator 13 and the wet gas separator 14. Besides, the humidifying membranes 12, the dry gas separators 13 and the wet gas separators 14 can be integrated with one another. With such integration, it becomes easy to handle the humidifying laminated body 2, and it also becomes possible to prevent the gases from leaking to the outside.

It is preferable that the amount of resin to be filled or impregnated be equal to or more than 100 volume % and less than 140 volume % of the pore volume in the humidifying membranes 12, and more preferably, equal to or more than 110 volume % and less than 120 volume %. If in these ranges, problems of gas leakage and the like will be particularly limited, and there will be no blockage of the pores in the humidifying membranes 12, which correspond to the moisture transmission portions 15, with a surplus amount of resin, or the possibility of the surplus resin exuding to the outer surfaces of the humidifying cells 1 can be reduced to a substantial extent. On the other hand, if the 140 volume % of the pore volume is exceeded, problems of the blockage of the pores in the humidifying membranes 12 with the resin and the like will become remarkable.

As resin materials having the above-mentioned property or performance, there are enumerated liquid resins that are able to be filled or impregnated into the humidifying membranes 12. The liquid resins mean resins with low viscosity such as to the extent that when filled, they can be impregnated into the pores in the porous humidifying membranes 12. As such liquid resins, there are enumerated thermoplastic resins, thermosetting resins with flowability enough to be filled into the humidifying membranes 12 before solidification, etc.

Preferably, thermoplastic resins capable of obtaining flowability necessary for filling or impregnation by heating can be used as a resin material to be filled or impregnated. The use of a thermoplastic resin can enhance the working or operation efficiency since the resin is able to be solidified by cooling immediately after the filling work.

In the case of using a thermoplastic resin, however, the resin used should be a material that does not become flowable until its temperature rises to exceed the operating temperature of the humidifier. Accordingly, the melting point of the resin to be filled should be at least higher than a maximum temperature of the high-temperature wet gas. For example, the general temperature of the wet gas is 90° C. or below, and it is necessary to use a resin that is not flowable at 90° C.

Moreover, the temperature required for the filling work or operation of the thermoplastic resin should be lower than the heatproof temperature of the humidifying membranes 12.

Here, note that in case where the melting point of the thermoplastic resin is lower than the heatproof temperature of the humidifying membranes 12, by heating the thermoplastic resin to melt again, it is possible to bond the dry gas separator 13 and the wet gas separator 14 to the humidifying membranes 12 thereby to put them into integration.

Preferably, resins generally called hot melt resins are used as examples of thermoplastic resins with such a characteristic. As typical hot melt resins, there are enumerated polyolefin based resins represented by polyethylene, polypropylene or the like, or resins that are formed by copolymerizing polyolefin and polyvinyl acetate or the like to improve their melting temperatures and adhesive properties. By using such polyolefin based resins, it is possible to make the resins flowable to a satisfactory extent at temperatures sufficiently lower than 200° C. that is the heatproof temperature of general humidifying membrane materials.

Additionally, polyolefin based resins can be preferably used since they are materials that are relatively stable even if exposed to a high humidity atmosphere of a temperature corresponding to that of the wet gas equal to or lower than 90° C.

As thermoplastic resins that can be similarly used, Nylon 11, nylon 12 and copolymer nylon based resins are enumerated, and polyester based resins represented by polyethylene terephthalate or its copolymer are also enumerated. Since such kinds of polyester resins are excellent in water resistance, they can be used preferably for humidifiers exposed to moisture. Moreover, polybutylene based resins, polymethyl methacrylate based resins and amorphous polyamide resins can also be used similarly.

In addition, there can also be used solventless ones among polymer-alloy based resins such as resins of polyvinyl formal-phenolic type, nitrile rubber-phenolic type, nylon-epoxy type, and nitrile rubber-epoxy type, and so on.

Moreover, as resins for filling, there can be similarly used ones that have sufficient flowability until solidified but can thereafter be solidified or hardened due to reactions with a hardener or due to heating. For example, it is possible to use an epoxy resin mixed with a hardner by first filling the epoxy resin into the humidifying membranes and then hardening or solidifying it by heating or the like. As other resin materials that can be similarly used, there are enumerated liquid acrylic rubber based resins, silicone resins, phenol resins, melamine resins, unsaturated polyester based resins, and polyurethane resins, and so on. By using thermosetting silicone based resins, it is possible to prepare each humidifying cell 1 which has high adhesion to an adjacent dry gas separator 13 and an adjacent wet gas separator 14 and hence is excellent in the gas sealing performance.

As a method of filling a thermoplastic resin into the humidifying membranes 12, there can be employed injection molding, its similar methods, compression molding, its similar methods or the like. For example, there is enumerated a method in which the humidifying membranes 12 are put in a mold, and a flowable resin is injected or impregnated into the humidifying membranes 12. In addition, as a much easier method capable of making uniform the amount of resin to be filled or injected per unit area, there is enumerated a method of injecting a resin into the humidifying membranes 12 by superposing thermoplastic resin sheets and the humidifying membranes 12 one over another by means of a hot press. If such a resin filling or injection operation is carried out under a reduced pressure, there will be no bubbles generated in the interior of the resin filled portion 51, so it is possible to obtain the resin filled portion 51 of much enhanced gas shielding or sealing performance. By cooling in case of a thermoplastic resin, or by performing a prescribed solidification process in case of a thermosetting resin, the resin thus filled can be put into a state capable of being used for a humidifying cell 1.

By filling or injecting a thermoplastic resin into the humidifying membranes 12, thereafter laminating the humidifying membranes 12, the dry gas separators 13 and the wet gas separators 14 one over another, and heating them while applying pressure thereto, the thermoplastic resin thus filled or injected is made to flow again, whereby the humidifying membranes 12, the dry gas separators 13 and the wet gas separators 14 can be integrated with one another. With the humidifying cells 1 integrated according to such a method, all the components from the humidifying membranes 12 to the dry gas separators 13 and the wet gas separators 14 are integrated with one another in a simple structure by means of resin layers. As a result, it is possible to obtain the humidifying cells 1 which are excellent not only in holding stability to the humidifying membranes 12 but also in gas sealing reliability and handleability.

Figure 10:
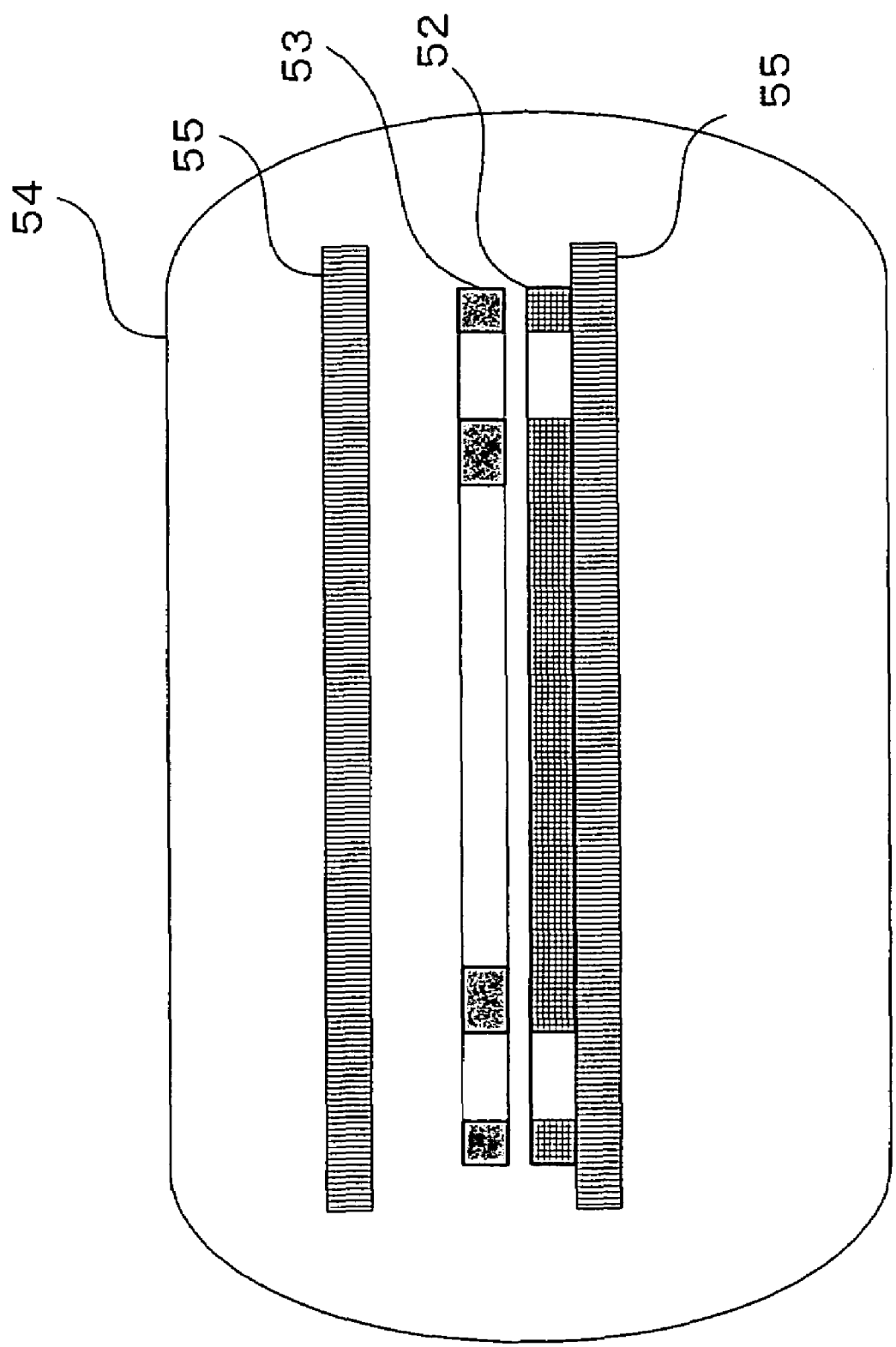
FIG. 10 is a view explaining how to perform a hot press to fill a resin into an unfilled humidifying membrane.
Figure 11:
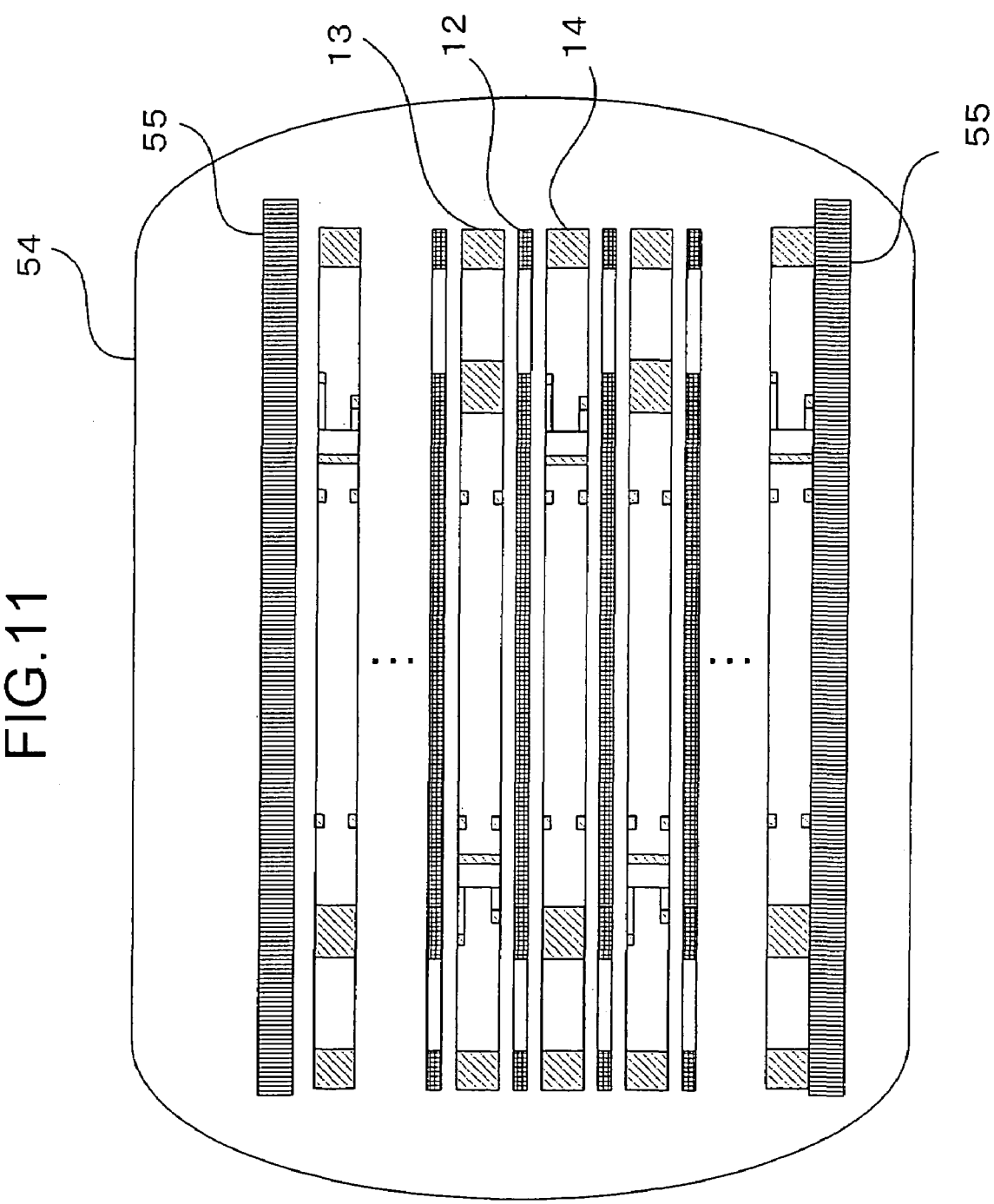
FIG. 11 is a view explaining how to laminate or prepare a humidifying laminated body.

Now, the production of a humidifying cell 1 will be described below more specifically. FIG. 10 is a view to illustrate how to perform a hot press to fill a resin into an unfilled humidifying membrane 52, and FIG. 11 is a view to describe how to produce or laminate a humidifying laminated body.

First of all, the unfilled humidifying membrane 52 is prepared by cutting out a rectangular sheet with a long side of 32 cm and a short side of 15 cm from a porous polytetrafluoroethylene (PTFE) resin sheet of 100 µm in thickness, and perforating through holes 50 in the rectangular sheet thus cut out.

Then, a resin sheet 53 was prepared by cutting out a sheet of such a shape as to superpose on or correspond to a resin filled portion 51 of the humidifying membrane 12 from a hot melt film of 100 µm in thickness made of a polyolefin based resin.

Thereafter, as shown in FIG. 10, the resin sheet 53 and the unfilled humidifying membrane 52 were superposed on each other, and the resin sheet 53 was temporarily attached to the unfilled humidifying membrane 52 from the resin sheet 53 side by means of an iron, set between a pair of flatbeds 55 of a hot press machine 54, and hot pressed at a temperature of 150° C. and at an applied pressure of 100 kPa while being placed into a vacuum state, whereby a humidifying membrane 12 was produced in which the resin filled portion 51 was formed with the resin of the resin sheet 53 being filled or impregnated into the unfilled humidifying membrane 52. The volume of the filled resin was about 110 volume % of the pore volume in the humidifying membrane 12. The flow starting temperature of this resin film was about 120° C., and the melt viscosity thereof at 150° C. was about 40,000 pois.

Subsequently, as shown in FIG. 11, a dry gas separator 13, a humidifying membrane 12 with a resin filled portion 51 formed therein, a wet gas separator 14, and a humidifying membrane 12 with a resin filled portion 51 formed therein were superposed one over another in this order in a necessary number of sheets, set between the flatbeds 55 of the hot press machine 54, and hot pressed at a temperature of 150° C. and at an applied pressure of 100 kPa while being placed into a vacuum state, whereby the resin once filled into the resin filled portion 51 was melted again to bond the dry gas separator 13 and the wet gas separator 14 to the humidifying membrane 12 on the opposite sides thereof at positions corresponding to the seal portions 17, thus preparing a humidifying laminated body 2.

Then, an inlet holding plate 3 and an outlet holding plate 4 were fixedly secured to an upper side and a lower side in the lamination direction of the humidifying laminated body 2 by using bolts 9 and nuts 10. Finally, a humidifier was completed by attaching a dry gas input pipe 5 and a wet gas output pipe 6 to the inlet holding plate 3, and by attaching a dry gas output pipe 7 and a wet gas input pipe 8 to the outlet holding plate 4.

Figure 12:
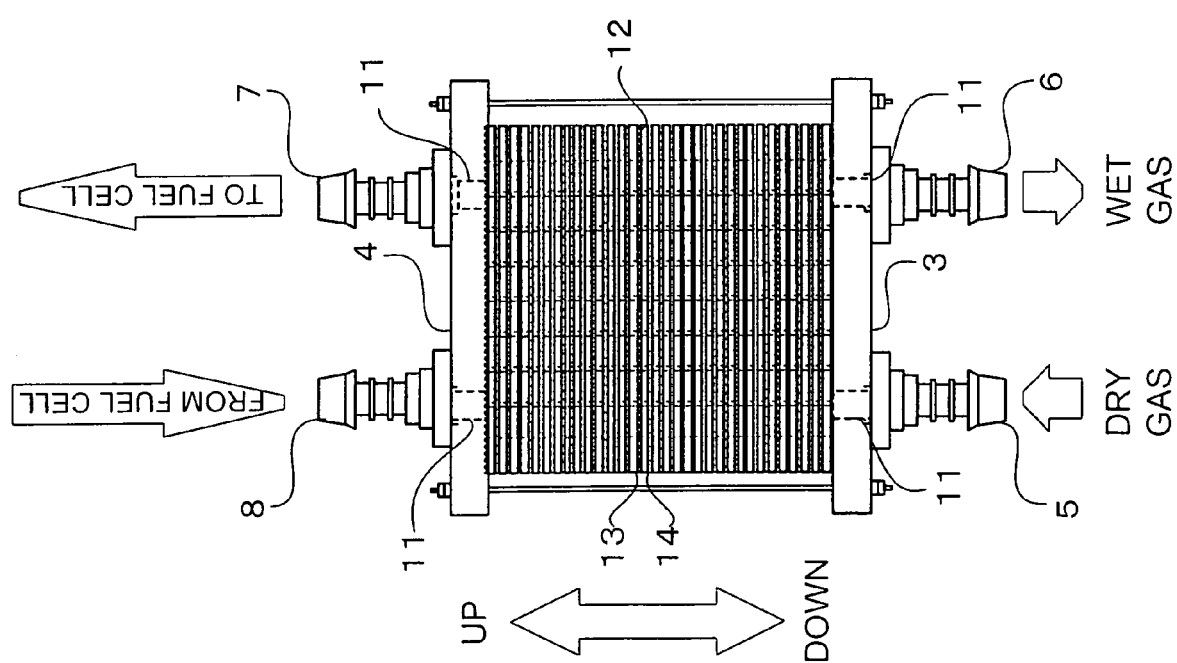
FIG. 12 is a view illustrating the appearance of the arrangement of the humidifier according to the first embodiment of the present invention.

The humidifier as constructed in the above manner was arranged in a manner as shown in FIG. 12. That is, the humidifier was arranged horizontally with the normal of the humidifying membranes 12 being oriented in the vertical direction, in accordance with which the dry gas separators 13 and the wet gas separators 14 were also laminated or arranged so as to horizontally contact the humidifying membranes 12, respectively.

Also, the inlet holding plate 3 and the outlet holding plate 4 were laminated or arranged in such a manner that the inlet holding plate 3 was placed in contact with a lowermost humidifying cell 1, whereas the outlet holding plate 4 was placed in contact with an uppermost humidifying cell 1.

Next, reference will be made to how moisture is transmitted from the wet gas to the dry gas by using the humidifier according to this first embodiment while referring to FIG. 5 and FIG. 7. The dry gas is supplied from the dry gas input pipe 5 to the first dry gas supply manifold 28 arranged in the dry gas separators 13 through a hole 11 in the inlet holding plate 3. The dry gas thus supplied is caused to flow to the first dry gas channels 23 through the aggregate communication grooves 37 in the dry gas separators 13, and it is further derived from the aggregate communication grooves 38 to the first dry gas exhaust manifold 29. Further, the dry gas is caused to flow from the first dry gas exhaust manifold 29 to the dry gas output pipe 7 through a hole 11 in the outlet holding plate 4, from which the dry gas is supplied to the fuel cell.

The dry gas supplied to the fuel cell is moistened or humidified by the water generated due to the reaction of hydrogen and oxygen and by the water accompanying proton and transmitted by an ion-exchange membrane, so that it is discharged as a wet gas. In this manner, the wet gas is higher in humidity than the dry gas.

This wet gas is supplied from the wet gas input pipe 8 to the first wet gas supply manifold arranged in the wet gas separators 14 through a hole 11 in the outlet holding plate 4. Further, the wet gas thus supplied is caused to flow through the wet gas channel 48 from the aggregate communication grooves 37 in the wet gas separators 14, and it is then derived from the aggregate communication grooves 38 to the first wet gas exhaust manifold. The wet gas is further derived from the first wet gas exhaust manifold to the wet gas output pipe 6 through a hole 11 in the inlet holding plate 3, from which it is exhausted to the outside.

Thus, the dry gas and the wet gas are caused to flow through the dry gas channel 23 and the wet gas channel 48 in opposite directions while counter flowing along the long sides of the dry gas separators 13 and the wet gas separators 14 in parallel with the humidifying membranes 12 being interposed therebetween. Moisture transfer between the dry gas and the wet gas, which are caused to flow in this manner, is carried out from the wet gas to the dry gas through the humidifying membranes 12, thereby increasing the humidity of the dry gas.

Here, note that when the air supplied to the fuel cell is humidified, high temperature water or the high temperature and high humidity exhaust gas from the fuel cell is supplied to the wet gas side, and normal temperature air is supplied to the dry gas side.

In addition, when the fuel supplied to the fuel cell is humidified, a hydrogen rich reformed gas processed by a reformer or pure hydrogen gas is supplied to the dry gas side.

Moreover, in the case of total heat exchange membranes being used, a high humidity gas such as fuel off-gas coming from the fuel cell, etc., is used.

For the purpose of comparison with the humidifier according to the first embodiment of the present invention, a humidifier described in Japanese patent application laid-open No. 2003-314983 is provided as a first comparison example. The humidifier according to this first comparison example is of a frame-shaped configuration in which a peripheral frame is arranged in such a manner that a frame-shaped portion forms an internal space opened vertically at the top and bottom thereof, and this humidifier has an inlet port and an outlet port formed so as to permit gas flows into and out of the internal space. Humidifying membranes are interposed between a wet gas and a dry gas for performing heat exchange and at the same time permitting moisture permeation. The frame-shaped portion is made of PPS resin, and the humidifying membranes are made of PTFE resin, as in the case of the first embodiment. In order to close the open top and bottom of the internal space in an air-tight manner, a frame-shaped portion, a humidifying membrane, a frame-shaped portion and so on are sequentially stacked or laminated one over another in this order to form a laminated body that is air-tight against the outside.

For example, among four sides of the laminated body, one side is set as a wet gas inlet port; another side opposite to the one side is set as a wet gas outlet port; a further side is set as a dry gas inlet port; and a still further side opposite to the further side is set as a dry gas outlet port. And corresponding supply and exhaust external manifolds are arranged to be connected with these ports, respectively. The frame-shaped portions and the humidifying membranes as constructed in this manner are alternately stacked or laminated, for example, ten frame-shaped portions and nine humidifying membranes are alternately laminated one over another, so that gas passages in the internal space are arranged to cross one another so as to make the flow of the dry gas and the flow of the wet gas normal with respect to each other, thus enabling moisture transfer therebetween through the humidifying membranes.

Figure 13:
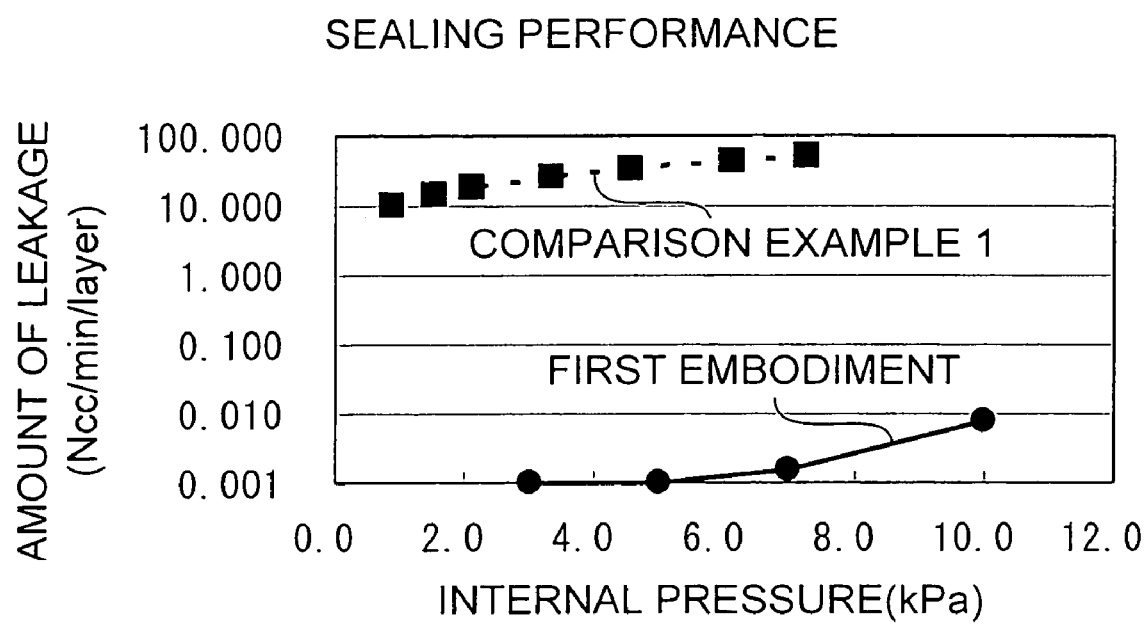
FIG. 13 shows the result of measurements of the sealing performance of the humidifier according to the first embodiment of the present invention and that of a humidifier according to a first comparison example.

With the use of the humidifiers according to the above-mentioned first embodiment and the first comparison example, the dry gas output pipes 7 are sealed or closed, and dry gases are input to the dry gas input pipes 5 with their pressures being varied, and, the amounts of gas leakage per layer of the humidifying membranes 12 at that time (Ncc/min/layer) were measured. Pressures of the dry gas were set to 1, 1.5, 2, 3, 4, 6, 7 (kPa), respectively, for the first comparison example, and set to 3, 5, 7, 10 (kPa), respectively, for the first embodiment. As shown in FIG. 13, in the first comparison example, the amount of leakage is 10 (Ncc/min/layer) at a pressure of 1 (kPa), whereas in the first embodiment, the amount of leakage is 0.003 (Ncc/min/layer) at a pressure of 7 (kPa), and hence the amount of leakage of about 1/10,000 or less is achieved.

Since the resin is filled into the resin filled portions 51 of the humidifying membranes 12, it is possible to prevent the dry gas and the wet gas from permeating through the humidifying membranes 12 in the direction parallel to their surfaces to leak into the outside.

Further, since the side frame-shaped portions 19a, 19b and the end frame-shaped portions 21a, 21b of the dry gas separators 13 and the wet gas separators 14 are bonded to the humidifying membranes 12 by means of the resin, it is possible to prevent the leakage of the gases through interfaces between the humidifying membranes 12 and the dry gas separators 13 and between the humidifying membranes 12 and the wet gas separators 14.

In addition, since the outer shapes of the resin filled portions 51 of the humidifying membranes 12 are the same as the outer shapes of the frame-shaped portions 22 of the dry gas separators 13 and the wet gas separators 14, there does not exist any portion formed of the resin alone, in which gas paths or channels can be easily generated, in the outer peripheral portions of the humidifying membranes 12, thus making it possible to achieve a high performance seal.

In addition, since the resin of a volume greater than the sum of the volumes of all the pores in the humidifying membranes 12 are filled into the pores, the gases in the pores of the humidifying membranes 12 are pushed out therefrom by the resin being filled therein, so pores with gases remaining therein can be eliminated.

The first dry gas supply manifold 28 is gas sealed by bonding the upper surface seal portion 31 surrounding the first dry gas supply manifold 28 to a humidifying membrane 12 laminated from above. Additionally, the first dry gas supply manifold 28 is also gas sealed by bonding the lower surface seal portion 32 surrounding the first dry gas supply manifold 28 to a humidifying membrane 12 laminated from below. Accordingly, there is no step and no difference in materials between the humidifying membranes 12 and the upper and lower surface seal portions 31, 32, so excellent sealing performance can be obtained.

The dry gas separators 13 and the wet gas separators 14 are in inverse relation to each other with respect to their short side direction and hence can be formed by resin molding using a common mold, so it is possible to reduce production costs by sharing the mold for the dry and wet gas separators. In addition, the use of the same parts serves to reduce management man-hours or the like.

Moreover, in the aggregate communication grooves 37, 38, the support walls 40 of the dry gas separators 13 and the support walls 40 of the wet gas separators 14 cross each other, so it is possible to effectively support the humidifying membranes 12 with a smaller number of the support walls 40.

Moreover, since the dry gas and the wet gas are caused to counter flow through the plurality of straight channel grooves arranged in the dry gas separators 13 and the wet gas separators 14, respectively, with the humidifying membranes 12 interposed therebetween, it is possible to output a heated and moistened dry gas of a high dew point and a high pressure.

Further, by arranging the humidifying membranes 12, the dry gas separators 13 and the wet gas separators 14 in a vertically laminated manner, liquid films of condensed moisture serve to wet the surfaces of the humidifying membranes 12, so moisture is transmitted therefrom to the dry gas that flows right under the humidifying membranes 12. As a result, the direction of gravity in which moisture is caused to move from top down and the direction in which moisture moves through the membranes can be made to coincide with each other, so moisture becomes easy to move, and humidification efficiency can be improved, thus making it possible to output the dry gas of a high dew point.

Furthermore, since the application of the heat of cooling water need not be used together or considered separately, it is possible to provide an inexpensive humidifier without incurring extra costs.

Although the humidifier of the first embodiment is constructed such that the same gas is supplied at the opposite sides of each separator with the kind of the gas being changed for each separator, a plate for shielding gas permeation may be arranged at an intermediate location in the widthwise direction of each separator, so that the dry gas and the wet gas are passed at the opposite sides of each separator. In this case, there will be no influence on the sealing performance of each separator.

In addition, although the wet gas is supplied to the humidifier of the first embodiment, similar sealing effects can be obtained even if cooling water is supplied as a cooling medium for the fuel cell instead of the wet gas according to the property of the humidifying membranes, for example, in the case of a humidifier using solid polymer membranes as the humidifying membranes.

Also, in the case of a humidifier using total heat exchange membranes, there will be similar sealing effects even if the fuel off-gas exhausted from the fuel cell is used as the wet gas.

Embodiment 2

Figure 14:
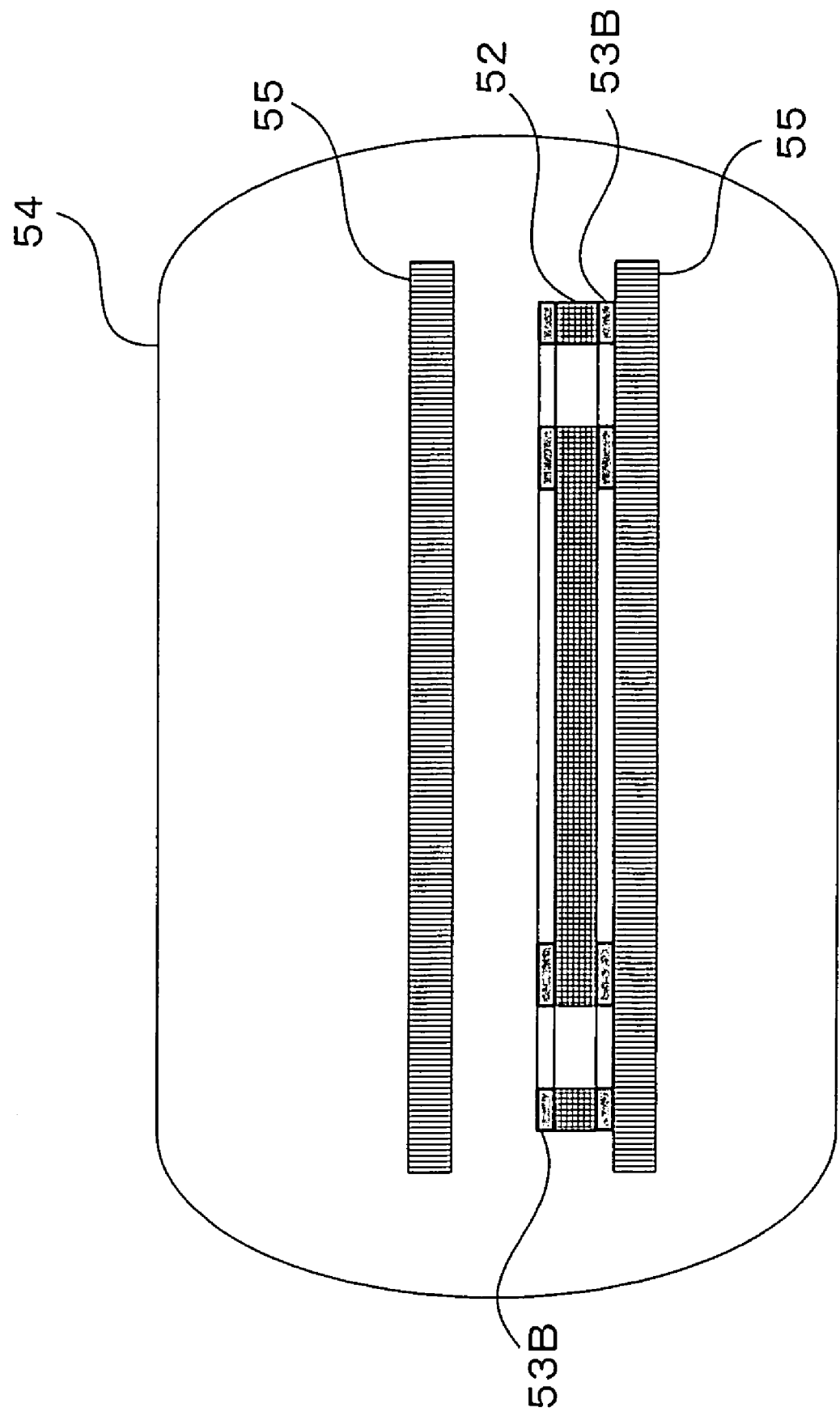
FIG. 14 is a view explaining how to perform a hot press to fill a resin into an unfilled humidifying membrane according to a second embodiment of the present invention.

FIG. 14 is a view illustrating how to perform a hot press that fills a resin into a humidifying membrane according to a second embodiment of the present invention. The process steps for producing the humidifier according to this second embodiment of the present invention are substantially similar to those for the above-mentioned first embodiment of the present invention, but are different from the steps for producing the humidifier according to the first embodiment in a step of filling a resin into the humidifying membranes. Thus, an explanation for similar steps as described above will be omitted. In addition, since the humidifier produced according to the second embodiment is similar in structure to the one described as the first embodiment, the same symbols as used above will be employed in the following description.

First of all, in order to fill a resin to the resin filled portion 51 of a humidifying membrane 12 according to the second embodiment, an unfilled humidifying membrane 52 was provided as in the first embodiment.

Then, a pair of resin sheets 53B were each prepared by cutting out a sheet of a shape congruent to that of the resin filled portion 51 of the humidifying membrane 12 from a hot melt film of 55 μm in thickness made of a polyolefin based resin. These resin sheets 53B were similar to the resin sheets 53 according to the first embodiment only except for their thickness.

As shown in FIG. 14, the pair of resin sheets 53B thus prepared were superposed on the opposite sides of the unfilled humidifying membrane 52, and then set between a pair of flatbeds 55 of a hot press machine 54. Thereafter, by hot pressing the resin sheets 53B and the unfilled humidifying membrane 52 under vacuum at a temperature of 150° C. and at an applied pressure of 100 kPa, a humidifying membrane 12 was produced in which a resin filled portion 51 was formed with the resin of the resin sheet 53 being filled or impregnated into the unfilled humidifying membrane 52. The volume of the filled resin was about 110 volume % of the pore volume in the humidifying membrane 12.

According to such a resin filling method, the thin resin sheets 53B each having a thickness half of their total thickness were filled or impregnated into the unfilled humidifying membrane 52 from the opposite sides thereof, the resin can be filled into the pores in the unfilled humidifying membrane 52 in an effective manner.

Embodiment 3

Figure 15:
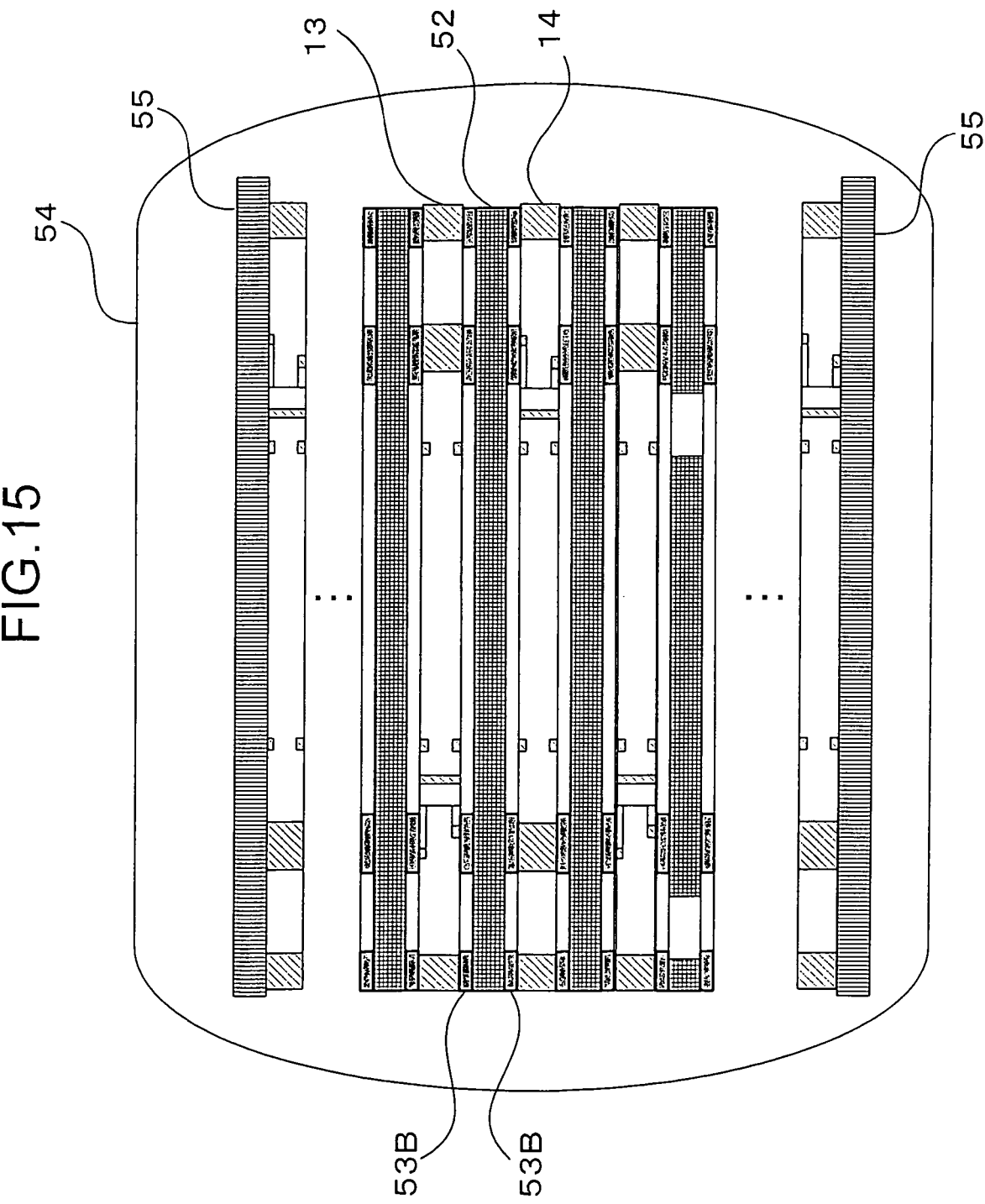
FIG. 15 is a view explaining how to laminate or prepare a humidifying laminated body according to a third embodiment of the present invention.

FIG. 15 is a view illustrating how to produce a humidifying laminated body by laminating humidifying cells according to a third embodiment of the present invention. In addition, since a humidifier produced according to the third embodiment is similar in structure to the one described as the first embodiment, the same symbols as used above will be employed in the following description. A step of filling a resin into unfilled humidifying membranes 52 according to the third embodiment is different from that in the first and second embodiment of the present invention, and is a step of filling a resin into unfilled humidifying membranes 52 and at the same time laminating dry gas separators 13 and wet gas separators 14 to produce a humidifying laminated body 2. Here, note that the unfilled humidifying membranes 52, the dry gas separators 13, and the wet gas separators 14 were prepared as in the case of the first embodiment, and resin sheets 53B were prepared as in the case of the second embodiment.

The humidifying laminated body 2 is produced as follows. That is, as shown in FIG. 15, a wet gas separator 14, a plurality of sets of resin sheets 53B, unfilled humidifying membranes 52, resin sheets 53B, dry gas separators 13, resin sheets 53B, unfilled humidifying membranes 52, and resin sheets 53B are laminated one over another in this order on a flatbed 55 of the hot press machine 54 so as to provide a necessary number of humidifying cells 1, and thereafter hot pressed under vacuum at a temperature of 150° C. and at an applied pressure of 100 kPa for a period of time of 5 minutes, whereby the resin is filled into the resin filled portions 51, and at the same time each dry gas separator 13 and each wet gas separator 14 are bonded to a corresponding humidifying membrane 12 on its opposite sides at positions corresponding to the seal portions 17, thereby producing the humidifying laminated body 2.

With the humidifying laminated body 2 produced in this manner, the molten resin is filled into the pores in the humidifying membranes 12, and at the same time the resin is fused to those portions of the dry gas separators 13 and the wet gas separators 14 which correspond to the seal portions 17 in a shape to follow minute irregularities existing therein. As a result, there will be no fear that gases might leak from inside the humidifying membranes 12, and from interfaces between the humidifying membranes 12 and the dry gas separators 13, and from interfaces between the humidifying membranes 12 and the wet gas separators 14.

Embodiment 4

Figure 16:
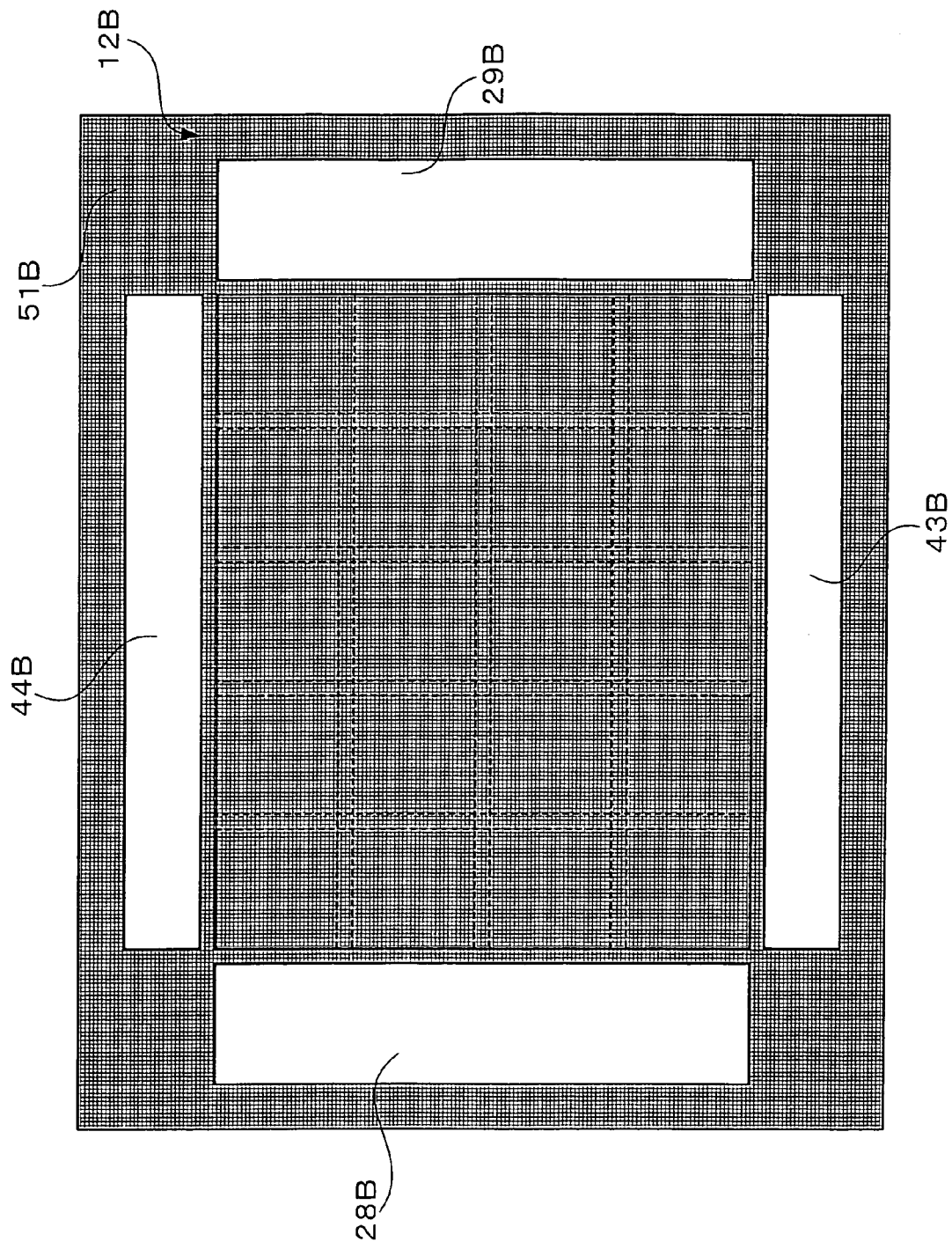
FIG. 16 is a plan view of a humidifying cell according to a fourth embodiment of the present invention.

FIG. 16 is a plan view of a humidifying cell according to a fourth embodiment of the present invention. In this regard, note that FIG. 16 is the plan view of the humidifying cell with a humidifying membrane being placed as the top layer, as seen from above.

The appearances of dry gas channels and wet gas channels are represented by broken lines in a part corresponding to a moisture transmission portion. In the humidifier of the first embodiment, the dry gas and the wet gas are caused to flow in counter flows. On the other hand, in the humidifier of this fourth embodiment, the dry gas and the wet gas are caused to flow in cross flows.

The dry gas is caused to flow from a dry gas supply manifold 28B shown in FIG. 16 in the right-hand direction of FIG. 16 through the dry gas channels, which are connected with the dry gas supply manifold 28B, to a dry gas exhaust manifold 29B connected with the dry gas channels, from which the dry gas is exhausted. Also, the wet gas is caused to flow from a wet gas supply manifold 44B in the downward direction of FIG. 16 through the wet gas channels, which are connected with the wet gas supply manifold 44B, to a wet gas exhaust manifold 43B connected with the dry gas channels, from which the wet gas is exhausted. While the dry and wet gases are flowing through the dry and wet gas channels, respectively, moisture is transmitted from the wet gas to the dry gas through the humidifying membranes 12B.

In the humidifying membranes 12B according to the fourth embodiment, the outer peripheral portions of the humidifying membranes 12B and resin filled portions 51B comprising those portions which surround the respective manifolds 28B, 29B, 43B and 44B are filled or impregnated by the resin, as shown in FIG. 16, and a humidifying laminated body is formed or laminated by a hot press as in the case of the first embodiment. As a consequence, the humidifying membranes 12B are bonded to dry gas separators and wet gas separators by means of the resin filled into the resin filled portions 51B.

Thus, in the humidifier of the cross flow type, the resin is filled into the resin filled portions 51B of the humidifying membranes 12B, so the dry gas and the wet gas will never leak in the direction parallel to the surfaces of the humidifying membranes 12B on their surfaces. In addition, since interfaces between the humidifying membranes 12B and the dry gas separators and interfaces between the humidifying membranes 12B and the wet gas separators are bonded to each other by means of the resin, there will be no fear that the dry gas and the wet gas might leak outside while transmitting through the interfaces.

Embodiment 5

Figure 17:
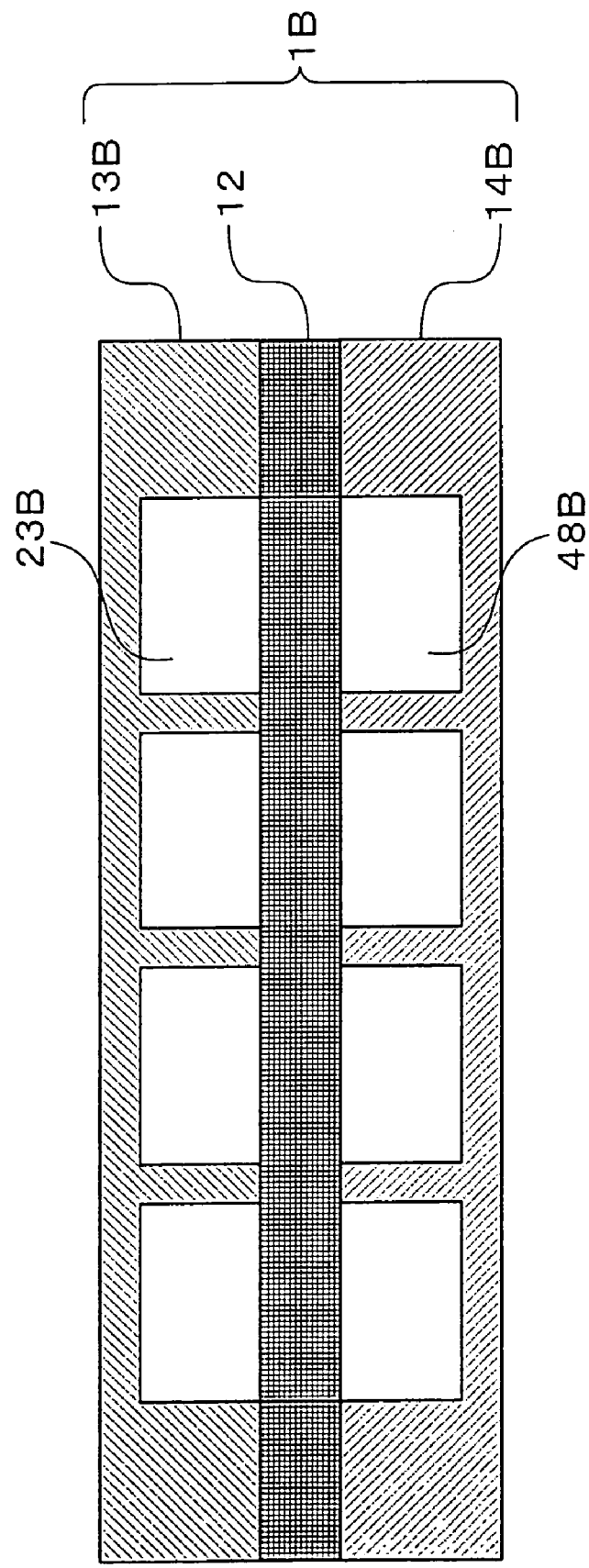
FIG. 17 is a cross sectional view of a humidifying cell according to a fifth embodiment of the invention.

FIG. 17 is a cross sectional view of a humidifying cell according to a fifth embodiment of the present invention. The humidifying cell 1B according to the fifth embodiment is different from the one according to the above-mentioned first embodiment in the dry gas separators 13 and the wet gas separators 14 thereof, but the other construction of this embodiment is similar to the first embodiment, and hence like components or parts are identified by like symbols while omitting a detailed explanation thereof. As shown in FIG. 17, a dry gas separator 13B and a wet gas separator 14B according to this fifth embodiment have dry gas channels 23B and wet gas channels 48B, respectively, each of which has a closed bottom at its one side and is opened at its other side. A humidifier according to the fifth embodiment is produced as follows. That is, a humidifying membrane 12 is prepared by hot pressing a resin sheet 53 on an unfilled humidifying membrane 52 to fill or impregnate a resin of the resin sheet into the unfilled humidifying membrane 52, as in the case of the first embodiment (see FIG. 10). Then, the dry gas separator 13B and the wet gas separator 14B are laminated on the humidifying membrane 12 from its opposite sides with the opened side of each dry gas channel 23B and the opened side of each wet gas channel 48B being arranged so as to face the humidifying membrane 12, placed between a pair of flatbeds 55 of a hot press machine 54, and thereafter hot pressed under vacuum at a temperature of 150° C. and at an applied pressure of 100 kPa for a period of time of 5 minutes, whereby the resin to be filled into resin filled portions is fused again to bond the dry gas separator 13B and the wet gas separator 14B to the humidifying membrane 12 on its opposite sides at positions corresponding to seal portions, thereby preparing a humidifying cell 1B. After that, a necessary number of humidifying cells 1B thus produced are stacked or laminated one over another and fixedly fastened by means of bolts and nuts.

With such a humidifier, the humidifying membrane 12 is bonded to the dry gas separator 13B and the wet gas separator 14B, so the humidifying membrane 12 becomes less prone to be wrinkled.

In addition, even if the humidifying membrane is wrinkled, such a wrinkle can be easily identified by a simple visual inspection, as a consequence of which efficient lamination of humidifying membranes can be carried out, thus making it possible to provide a humidifier of high quality at low cost.

While the invention has been described in terms of preferred embodiments, those skilled in the art will recognize that the invention can be practiced with modifications within the spirit and scope of the appended claims.

What is claimed is:

1. A humidifier comprising:
   a plurality of moisture permeable humidifying membranes; and
   a plurality of gas separators each having one or two channels opened on at least one side in a direction of lamination, through which at least one of a dry gas and a wet gas is caused to flow;

wherein
   one of said humidifying membranes, one of said gas separators, another one of said humidifying membranes, and another one of said gas separators are repeatedly laminated one over another in this order, or one of said gas separators, one of said humidifying membranes, and another one of said gas separators are repeatedly laminated one over another in this order;
   each of said gas separators has a frame-shaped portion surrounding said one or two channels; and
   those portions of said humidifying membranes which, when laminated, are arranged to face the whole area of said frame-shaped portions of said gas separators are filled with a resin.

2. The humidifier as set forth in claim 1, wherein each of said frame-shaped portions is bonded, through the resin, to that portion of a corresponding humidifying membrane which is arranged to face said frame-shaped portion.

3. The humidifier as set forth in claim 1, wherein said resin is a solidified liquid resin.

4. The humidifier as set forth in claim 1, wherein said resin is a thermoplastic resin that has a melting point higher than the temperature of said wet gas.

5. The humidifier as set forth in claim 1, wherein said resin is a hot melt resin composed of a polyolefin based resin as its principal component.

6. The humidifier as set forth in claim 1, wherein said dry gas is a gas supplied to a fuel cell.

7. A method for producing a humidifier that includes a plurality of moisture permeable humidifying membranes, and a plurality of gas separators each having a frame-shaped portion and one or two channels opened on opposite sides in a direction of lamination, through which at least one of a dry gas and a wet gas is caused to flow, wherein one of said humidifying membranes, one of said gas separators, another one of said humidifying membranes and another one of said gas separators are repeatedly laminated one over another in this order, said method comprising the steps of:
   cutting a resin sheet into a shape of that surface of the frame-shaped portion of each of said laminated gas separators which is in contact with a corresponding humidifying membrane;
   laminating said cut resin sheet on said corresponding humidifying membrane; and
   heating under pressure said resin sheet from its opposite sides thereby to fuse said resin sheet to fill a resin therein into said humidifying membranes.

8. The method for producing a humidifier as set forth in claim 7, further comprising the steps of:
   repeatedly laminating one of said gas separators, one of said humidifying membranes with said resin filled therein, another one of said gas separators and another one of said humidifying membranes with said resin filled therein one over another in this order; and
   heating under pressure said gas separators and said humidifying membranes in a clamped manner in the direction of lamination thereby to fuse said resin again to bond said gas separators to said humidifying membranes to prepare a laminated body.

9. The method for producing a humidifier as set forth in claim 7, wherein
   in said resin filling step, a pair of said cut resin sheets are laminated on said corresponding humidifying membrane from its opposite sides, and
   said pair of cut resin sheets are heated under pressure in a clamped manner in the direction of lamination to fuse said resin sheets, thereby filling the resin therein into said corresponding humidifying membrane.

10. A method for producing a humidifier that includes a plurality of moisture permeable humidifying membranes, and a plurality of gas separators each having a frame-shaped portion and two or one channel opened at opposite sides in a direction of lamination, through which at least one of a dry gas and a wet gas is caused to flow, wherein one of said humidifying membranes, one of said gas separators, another one of said humidifying membranes, another one of said gas separators are repeatedly laminated one over another in this order, said method comprising the steps of:

repeatedly laminating one of said gas separators, a resin sheet cut into a shape of that surface of the frame-shaped portion of each of said laminated gas separators which is in contact with a corresponding humidifying membrane, and one of said humidifying membranes one over another in this order; and heating under pressure said gas separators, said resin sheets and said humidifying membranes in a clamped manner in the direction of lamination thereby to fuse said resin sheets to bond said gas separators to said humidifying membranes to prepare a laminated body.

11. The method for producing a humidifier as set forth in claim 10, wherein in said laminated body preparing step, one of said gas separators, one of said resin sheets, one of said humidifying membranes, and another one of said resin sheets are repeatedly laminated one over another in this order, and heated under pressure in a clamped manner in the direction of lamination to fuse said resin sheets thereby to fill the resin therein into said humidifying membranes, thus bonding said gas separators to said humidifying membranes to prepare said laminated body.

12. The method for producing a humidifier as set forth in claim 7, wherein the total thickness of said resin sheets filled into each of said humidifying membranes is greater than the thickness of each of said humidifying membranes.

13. The humidifier as set forth in claim 1, wherein the amount of resin filled in said resin filled portion of said humidifying membranes is equal to or more than 100 volume % and less than 140 volumes % of the pore volume humidifying membranes.

14. The method for producing a humidifier as set forth in claim 7, wherein the amount of the resin filled in said resin filled portion of said humidifying membranes is equal to or more than 100 volumes % and less than 140 volume % of the pore volume in said humidifying membranes.

15. The method for producing a humidifier as set forth in claim 10, wherein the amount of resin filled in said filled portion of said humidifying membranes is equal to or more than 100 volume % and less than 140 volumes % in said humidifying membranes.

* * * * *